US012679094B2

(12) United States Patent
Zhang et al.

(10) Patent No.: US 12,679,094 B2
(45) Date of Patent: Jul. 14, 2026

(54) LIQUID DISCHARGE HEAD, LIQUID DISCHARGE APPARATUS, AND METHOD FOR MANUFACTURING LIQUID DISCHARGE HEAD

(71) Applicants: Jun Zhang, Kanagawa (JP); Sho Kawakami, Kanagawa (JP); Yasunori Sugimoto, Kanagawa (JP); Toshihiro Kanematsu, Kanagawa (JP); Kiyoshi Amari, Kanagawa (JP)

(72) Inventors: Jun Zhang, Kanagawa (JP); Sho Kawakami, Kanagawa (JP); Yasunori Sugimoto, Kanagawa (JP); Toshihiro Kanematsu, Kanagawa (JP); Kiyoshi Amari, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 174 days.

(21) Appl. No.: 18/604,536

(22) Filed: Mar. 14, 2024

(65) Prior Publication Data

US 2024/0316933 A1 Sep. 26, 2024

(30) Foreign Application Priority Data

Mar. 22, 2023 (JP) ................................ 2023-045094

(51) Int. Cl.
*B41J 2/14* (2006.01)
*B41J 2/045* (2006.01)
(Continued)

(52) U.S. Cl.
CPC ......... *B41J 2/1433* (2013.01); *B41J 2/04581* (2013.01); *B41J 2/162* (2013.01); *B41J 2/1623* (2013.01); *B41J 2/17596* (2013.01)

(58) Field of Classification Search
CPC ...... B41J 2/1433; B41J 2/04581; B41J 2/162; B41J 2/1623; B41J 2/17596
See application file for complete search history.

(56) References Cited

U.S. PATENT DOCUMENTS

| | | | |
|---|---|---|---|
| 6,015,514 | A | 1/2000 | Koseko |
| 2009/0051735 | A1 | 2/2009 | Takahashi et al. |

(Continued)

FOREIGN PATENT DOCUMENTS

| | | | |
|---|---|---|---|
| EP | 2 979 873 | A1 | 2/2016 |
| JP | 2001-301176 | A | 10/2001 |

(Continued)

OTHER PUBLICATIONS

Extended European Search Report issued Aug. 2, 2024 in European Patent Application No. 24162877.5, 8 pages.

*Primary Examiner* — Jason S Uhlenhake
(74) *Attorney, Agent, or Firm* — XSENSUS LLP

(57) ABSTRACT

A liquid discharge head includes: a nozzle plate having multiple nozzle holes from which a liquid is dischargeable, the multiple nozzle holes arrayed in a nozzle array direction; a housing bonded to the nozzle plate by a diffusion bonding to support the nozzle plate; multiple connecting portions: disposed on one of the nozzle plate or the housing; contacting the nozzle plate and the housing to bond the nozzle plate and the housing; arrayed in the nozzle array direction; and having a channel in each of the multiple connecting portions, the channel communicating with the nozzle holes; and a gap formed between one of the multiple connecting portions and another of the multiple connecting portions adjacent to the one of the multiple connecting portions.

20 Claims, 19 Drawing Sheets

(51) Int. Cl.
*B41J 2/16* (2006.01)
*B41J 2/175* (2006.01)

(56) References Cited

U.S. PATENT DOCUMENTS

| | | | |
|---|---|---|---|
| 2014/0078220 | A1 | 3/2014 | Sawada et al. |
| 2017/0239950 | A1* | 8/2017 | Nishida ................ B41J 2/14209 |
| 2022/0379609 | A1 | 12/2022 | Matsufuji et al. |
| 2023/0302799 | A1* | 9/2023 | Fujita ....................... B41J 2/155 |
| 2023/0373214 | A1 | 11/2023 | Kawakami et al. |

FOREIGN PATENT DOCUMENTS

| | | | |
|---|---|---|---|
| JP | 2005-103772 | A | 4/2005 |
| JP | 2006-168189 | A | 6/2006 |
| JP | 2023-140940 | A | 10/2023 |
| WO | 2022/259063 | A1 | 12/2022 |

* cited by examiner

COMPARATIVE EXMPLE

LIQUID DISCHARGE HEAD, LIQUID DISCHARGE APPARATUS, AND METHOD FOR MANUFACTURING LIQUID DISCHARGE HEAD

CROSS-REFERENCE TO RELATED APPLICATION

This patent application is based on and claims priority pursuant to 35 U.S.C. § 119(a) to Japanese Patent Application No. 2023-045094, filed on Mar. 22, 2023, in the Japan Patent Office, the entire disclosure of which is hereby incorporated by reference herein.

BACKGROUND

Technical Field

The present embodiment relates to a liquid discharge head, a liquid discharge apparatus, and a method for manufacturing the liquid discharge head.

Description of the Related Art

A liquid discharge head discharges droplets, such as an ink, from a nozzle, and opens and closes the nozzle using a nozzle opening and closing valve (a needle valve) disposed in the nozzle (a nozzle hole), nozzle opening and closing drive means (a piezoelectric element, an actuator) that separates and brings the nozzle opening and closing valve from and into contact with the nozzle, and control means that controls the nozzle opening and closing drive means to discharge a liquid. In such a liquid discharge head, a liquid to be discharged is pressurized and supplied to the nozzle, and in this state, the nozzle opening and closing valve is separated from and brought into contact with the nozzle, so that the pressurized and supplied liquid is discharged as droplets from the nozzle only while the nozzle opening and closing valve is separated from the nozzle. Some liquid discharge heads that discharge a liquid containing an ink from a nozzle include a liquid channel inside, and the liquid channel includes multiple laminated metal plates and a housing. Examples of a method for bonding the multiple metal plates and the housing include adhesion using an adhesive and metal diffusion bonding.

SUMMARY

According to an aspect of the present disclosure, a liquid discharge head includes: a nozzle plate having multiple nozzle holes from which a liquid is dischargeable, the multiple nozzle holes arrayed in a nozzle array direction; a housing bonded to the nozzle plate by a diffusion bonding to support the nozzle plate; multiple connecting portions: disposed on one of the nozzle plate or the housing; contacting the nozzle plate and the housing to bond the nozzle plate and the housing; arrayed in the nozzle array direction; and having a channel in each of the multiple connecting portions, the channel communicating with the nozzle holes; and a gap formed between one of the multiple connecting portions and another of the multiple connecting portions adjacent to the one of the multiple connecting portions.

According to another aspect of the present disclosure, a liquid discharge head includes: a nozzle plate having multiple nozzle holes from each of which a liquid is dischargeable; a housing supporting the nozzle plate; a diffusion bonding member between the nozzle plate and the housing and bonded to each of the nozzle plate and the housing by a diffusion bonding, the diffusion bonding member including: multiple connecting portions arrayed in an array direction of the multiple nozzle holes, the multiple connecting portions contacting the nozzle plate and the housing to bond the nozzle plate and the housing; multiple channels in the multiple connecting portions and communicating with the multiple nozzle holes of the nozzle plate, respectively; a gap formed between one of the multiple connecting portions and another of the multiple connecting portions adjacent to the one of the multiple connecting portions; and a wall portion along an outer periphery portion of the nozzle plate, the wall portion contacting the nozzle plate and the housing to bond the nozzle plate and the housing.

According to further another aspect of the present disclosure, a manufacturing method includes: contacting and bonding a nozzle plate having multiple nozzle holes and a housing to support the nozzle plate; forming multiple connecting portions on one of the nozzle plate or the housing, the multiple connecting portions arrayed in an array direction of the multiple nozzle holes; bringing the multiple connecting portions into contact with the one of the nozzle plate or the housing to bond the nozzle plate and the housing; forming multiple channels, communicating with the multiple nozzle holes of the nozzle plate, in the multiple connecting portions, respectively; forming a gap between one of the multiple connecting portions and another of the multiple connecting portions adjacent to one of the multiple connecting portions; and performing a diffusion bonding between the nozzle plate and the housing via the multiple connecting portions.

BRIEF DESCRIPTION OF THE SEVERAL VIEWS OF THE DRAWINGS

A more complete appreciation of embodiments of the present disclosure and many of the attendant advantages and features thereof can be readily obtained and understood from the following detailed description with reference to the accompanying drawings, wherein.

Figure 1:
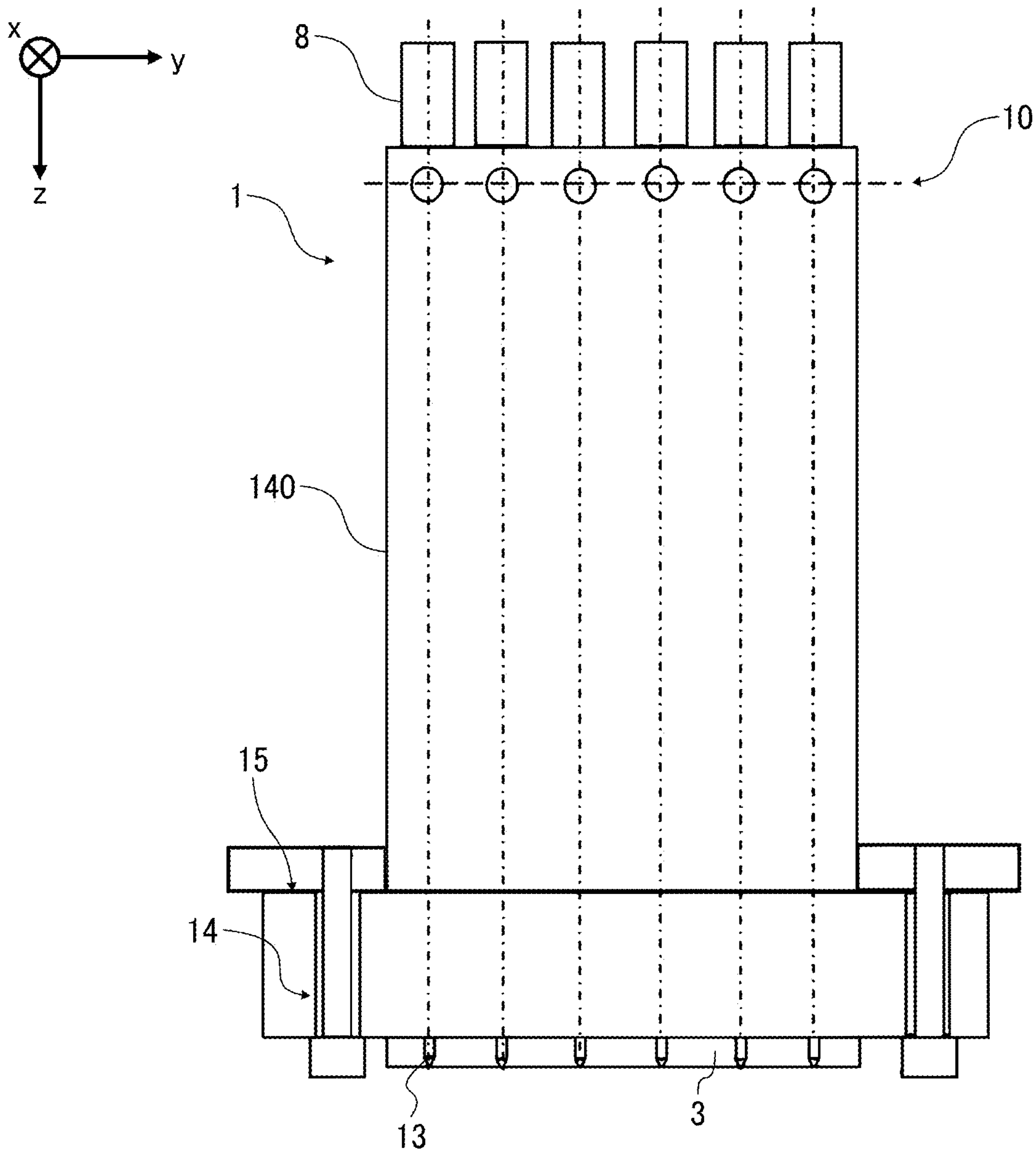
FIG. 1 is a diagram illustrating a discharge head according to the present embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An embodiment according to the present embodiment will be described below with reference to the drawings. In the present embodiment, a liquid discharge head may be referred to as a discharge head.

In the drawings for describing the embodiment of the present embodiment, constituent elements, such as members and components, having identical functions or shapes are given identical reference numerals as far as distinguishable, and redundant descriptions are omitted.

Figure 2:
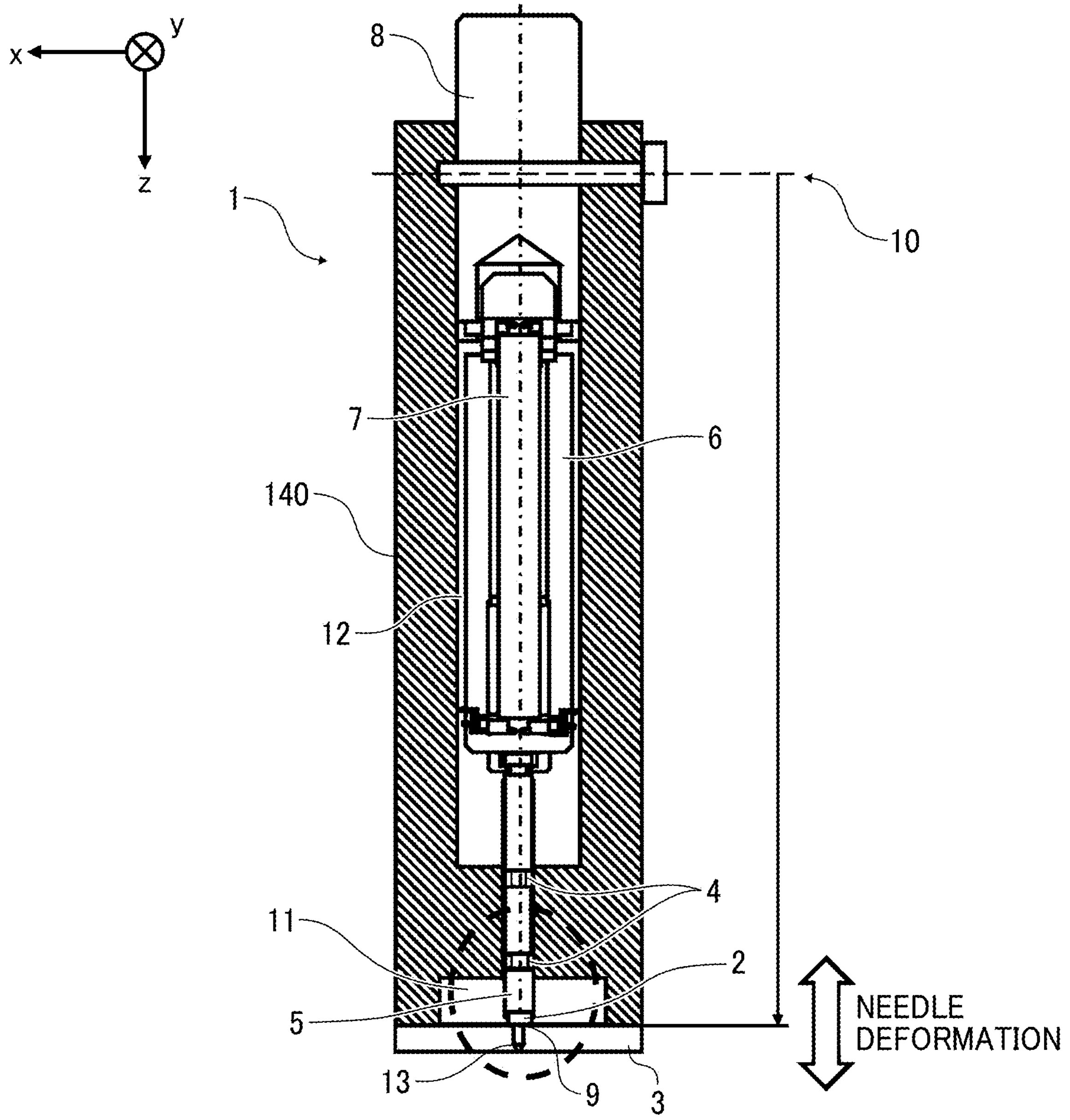
FIG. 2 is a diagram illustrating a main configuration of the discharge head.
Figure 3:
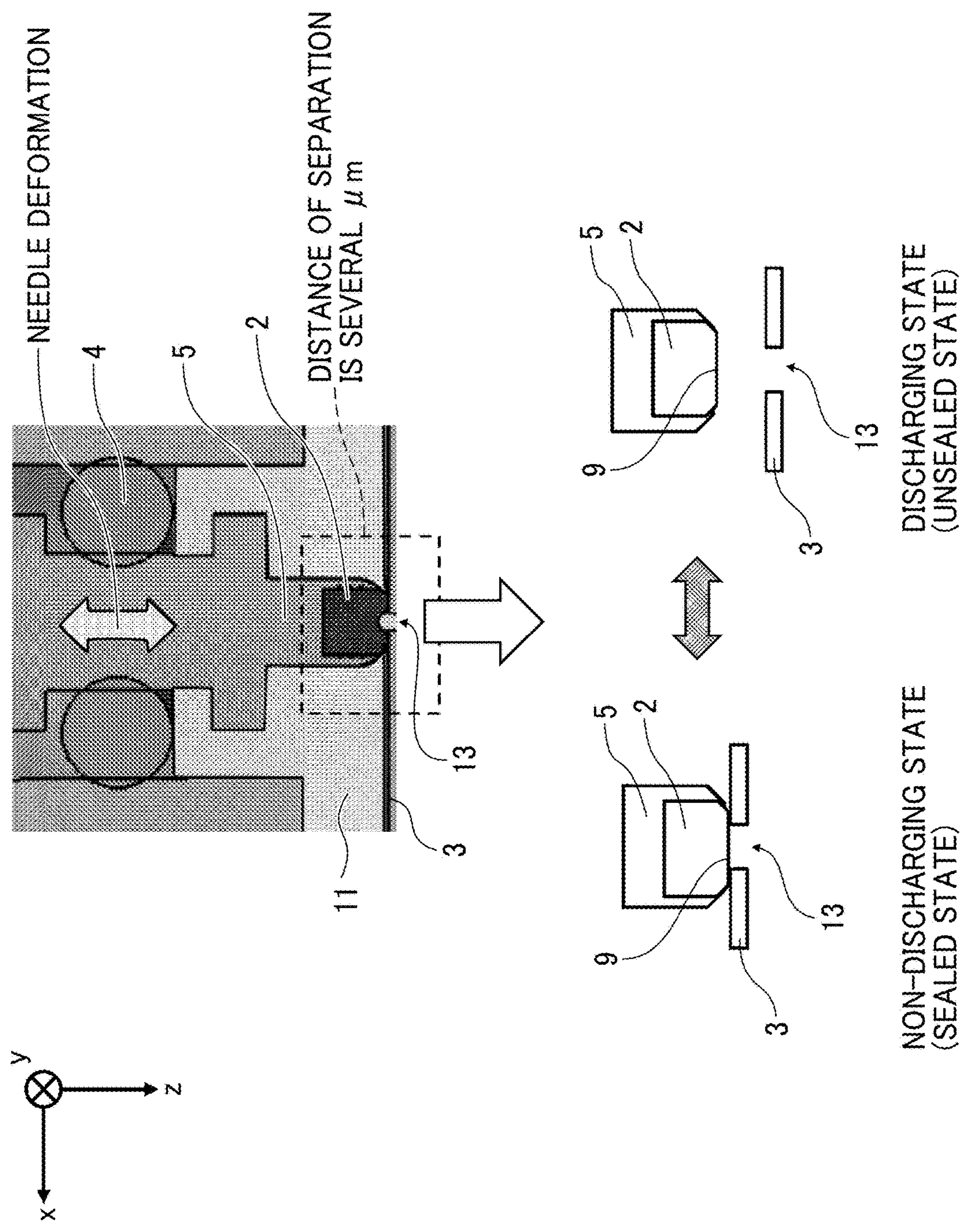
FIG. 3 is a diagram illustrating a positional relationship between parts of a nozzle and a needle valve.

FIG. 1 is a diagram illustrating a discharge head (a liquid discharge head) in the embodiment according to the present embodiment. FIG. 2 is a diagram illustrating a main configuration of the discharge head in the embodiment according to the present embodiment. FIG. 3 is an enlarged view of a part of a nozzle and a needle valve as an opening and closing valve in the main configuration of the discharge head in the embodiment according to the present embodiment, and illustrates a positional relationship between the nozzle and the needle valve. FIG. 3 is also an enlarged view of a portion surrounded by a broken line circle in FIG. 2.

First, FIG. 1 is used to give a description. Here, in FIG. 1, a lateral direction in FIG. 1 is a y direction, a direction perpendicular to a paper surface is an x direction, and a vertical direction in FIG. 1 is a z direction. The z direction is defined as an opening and closing direction (an up-and-down direction, a longitudinal direction of a piezoelectric element, an extension and contraction direction of the piezoelectric element) of the needle valve. The definitions of the directions in the subsequent drawings are the same unless otherwise specified. As illustrated in FIGS. 1 to 3, a discharge head 1 (an example of the liquid discharge head) includes a nozzle plate 3 (an example of a nozzle plate) having a nozzle 13 (an example of a nozzle hole, also referred to as a nozzle hole) from which an ink (an example of a liquid) is discharged, a liquid chamber 11 that supplies a pressurized ink to the nozzle 13, a needle valve 5 (an example of a valve body) that is provided in the liquid chamber 11 and opens and closes a hole of the nozzle 13, a piezoelectric element 7 (an example of moving means) that drives the needle valve 5, and a housing (also referred to as a housing body) 140 in which a piezoelectric element housing space 12 that houses the piezoelectric element 7 is formed. The piezoelectric element 7 also has the property of extending and contracting according to a linear expansion coefficient due to a change in temperature. Since the piezoelectric element 7 has a negative linear expansion coefficient at room temperature or in a general use temperature range, the piezoelectric element 7 has the property of shrinking when the temperature is increased. An O-ring 4 as a sealing member is disposed between the needle valve 5 and the housing 140 in the liquid chamber 11, and the O-ring 4 prevents an ink from entering the piezoelectric element 7 from the liquid chamber 11.

The nozzle plate 3 is bonded to a part in which the liquid chamber 11 of the housing 140 is formed. The nozzle 13 in the nozzle plate 3 and the needle valve 5 are brought into contact with each other so as to close the nozzle 13. A seal member 9 is formed in a tip end insertion portion 2 of the needle valve 5. The tip end insertion portion 2 is a leading end of the needle valve 5. The piezoelectric element 7 is driven to displace the needle valve 5, and the seal member 9 is pressed by this displacement to close the nozzle 13. Examples of the seal member 9 include an elastic body such as a resin member (a fluororesin) and a rubber member.

The piezoelectric element 7 is bonded to a piezoelectric element fixing member 8 and the needle valve 5 via a piezoelectric element holding member 6, and is secured to the housing 140 via the piezoelectric element fixing member 8. The piezoelectric element 7 extends or contracts with a reference point 10 as a fixed reference to displace the needle valve 5. In the above configuration, the needle valve 5 is separated in the direction (a z-axis direction) of abutting on the nozzle 13 by the operation of the piezoelectric element 7, so that a pressurized liquid can be discharged. Arranging a discharge structure (also referred to as CH or a channel) including the nozzle 13, the needle valve 5, and the piezoelectric element 7 illustrated in FIGS. 1 to 3 in the y direction of FIG. 1 allows forming a discharge head that discharges from multiple nozzles. FIG. 1 illustrates a discharge head having 8-CH nozzles as an example. Note that the present embodiment is not limited thereto. Therefore, the number of CHs and the arrangement direction of the nozzles are not limited thereto.

The liquid discharge head includes: a valve body movable between a separated position separated from the nozzle plate to open one of the multiple nozzle holes; and a contact position at which the valve body contacts the nozzle plate to close one of the multiple nozzle holes; and a mover to move the valve body.

Here, as illustrated in FIG. 3, a gap between the nozzle 13 and the needle valve 5 that can be separated from each other is a gap of several μm to several tens of μm, and is extremely small. In the present embodiment, a distance of the gap that separates the needle valve 5 from the nozzle 13 is referred to as a lift amount (or a gap amount). In the present embodiment, the lift amount of the nozzle 13 and the needle valve 5 is set to, for example, 5 to 50 μm.

When the discharge head 1 is mounted on a liquid discharge apparatus 100, the discharge head 1 is attached to a carriage (an example of a discharge head support unit for supporting the discharge head) 1000 for moving to a discharge target object, a movable unit, or the like to form a discharge unit. When the discharge head 1 is attached to the carriage 1000, a screw is attached to a carriage attachment surface 15 through a screw fastening hole 14 in the housing 140 to be fastened. The liquid discharge apparatus 100 and the carriage 1000 will be described in detail later.

Diffusion Bonding

Here, diffusion bonding will be described. Hereinafter, metal diffusion bonding is simply referred to as diffusion bonding. First, in a case of bonding by diffusion bonding, multiple metal plates and a housing are sandwiched between flat jigs from both surfaces, and depending on a material of a component, in a case of metal, bonding is generally performed by pressurizing while heating to a high temperature (about 1000° C.) under the vacuum condition. As a result, metal atoms are diffused and bonded to one another between interfaces of the metal plates or on a bonding surface between the metal plates and the housing.

In a case of bonding by this diffusion bonding, since the multiple metal plates and the housing can be bonded at a time, steps can be simplified. The diffusion bonding is also excellent in liquid resistance and corrosion resistance compared with bonding using an organic adhesive. Since the diffusion bonding is performed at an atomic level of metal, there is also an advantage in that a bonding force is strong compared with bonding using an organic adhesive. Due to these excellent points, studies have been actively conducted so far on the assumption that bonding by the diffusion bonding is highly expected.

In a case where this diffusion bonding is applied to the discharge head, the diffusion bonding is mainly used for bonding the nozzle plate and the housing, but since it is not necessary to bond the nozzle plate and the housing using an adhesive or the like, damage of a bonding portion due to a liquid to be discharged is eliminated. Therefore, a liquid that dissolves or corrodes an adhesive or the like can also be discharged by the discharge head. In addition, by using the diffusion bonding, bonding can be performed at an atomic level of metal, so that a bonding strength between the nozzle plate and the housing can be greatly improved. Accordingly, since the pressure of a liquid in a liquid chamber can be increased, the discharge head can discharge a liquid having high viscosity. Since the bonding strength between the nozzle plate and the housing can be increased, the durability of a liquid discharge head of a type using a valve body such as a needle valve that presses the nozzle plate can be increased.

[Diffusion Bonding of Nozzle Plate and Housing]

Figure 4A:
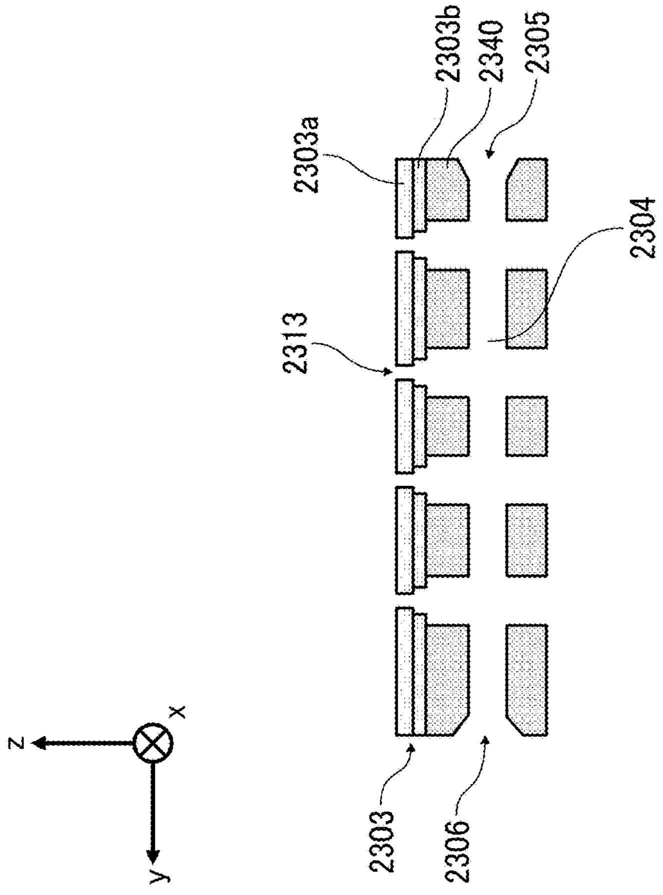
FIGS. 4A and 4B are diagrams illustrating diffusion bonding of a nozzle plate and a housing.
Figure 4B:
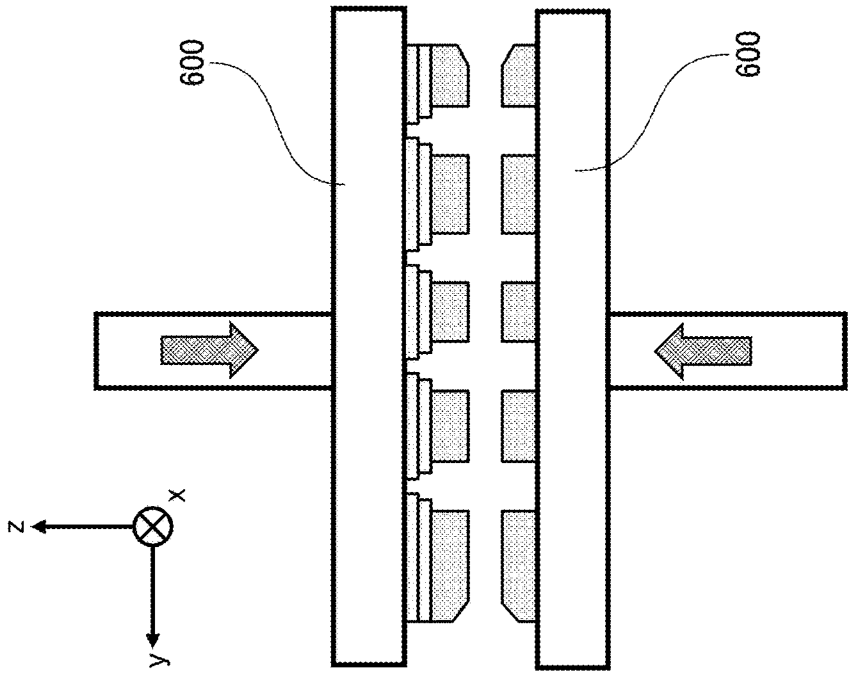

Next, the diffusion bonding of the nozzle plate and the housing will be described. Note that reference numerals of terms are also given again for convenience of description. FIGS. 4A and 4B are diagrams illustrating diffusion bonding of the nozzle plate and the housing. A liquid channel is formed inside a discharge head configured by a nozzle plate having multiple laminated metal plates and a housing (that discharges droplets). FIG. 4A illustrates an example of a simple structure of the discharge head. FIG. 4B is a diagram illustrating bonding a configuration according to FIG. 4A by the diffusion bonding.

As illustrated in FIG. 4A, a nozzle plate 2303 having multiple nozzles 2313 that discharges a liquid, such as an ink, has two nozzle plates 2303*a* and 2303*b*, and the nozzles 2313 communicate with a common channel 2304 passing through the inside of a housing 2340. The housing 2340 has an inlet 2305 that is a liquid inflow side bonded to the common channel 2304 and an outlet 2306 that is a liquid outflow side.

As illustrated in FIG. 4B, in the configuration according to FIG. 4A, the nozzle plate 2303 and the housing 2340 are sandwiched between flat jigs 600 from both end sides (upper and lower sides in FIG. 4B) of a nozzle plate 2303 side and a housing 2340 side and are placed in a vacuum electric furnace, and the temperature is raised while a pressure is applied in directions (the z-axis direction) indicated by black arrows in FIG. 4B to perform the diffusion bonding. At this time, a degree of vacuum of the vacuum electric furnace is about $10^{-3}$ to $10^{-4}$ Pa. The set temperature and the pressure to be applied depend on a material and an internal structure, and generally, the temperature is about 1000° C., and the pressure is about 20 MPa. Under such conditions, one or multiple nozzle plates is reliably bonded to the housing, and can be obtained as a configuration of the liquid discharge head.

Here, the nozzle plate 2303 and the housing 2340 are made of a metal material, and a stainless material is generally selected. Specific examples of the stainless material include an austenitic stainless material, a ferritic stainless material, or a martensitic stainless material. This is because it is considered that the strength of the liquid discharge head can be maintained by securing sufficient strength capable of withstanding the internal pressure of a liquid in the liquid chamber. The stainless material has ink resistance and corrosion resistance. The material may be specialized in consideration of a use environment of the discharge head, heat generation during use, and the like. For example, austenitic SUS304 and SUS316 are given when corrosion resistance against a liquid used in the liquid discharge head is considered important. In addition, in a case where it is desired to suppress thermal expansion due to heat generation, ferritic stainless steel having a small linear expansion coefficient, for example, SUS430 is given.

In the diffusion bonding, bonding is performed under high temperature and high pressure conditions. In view of such a high temperature condition, thermal characteristics should be considered for components of the liquid discharge head. For example, the linear expansion coefficient of SUS304 is 17.3E-6/° C., whereas the linear expansion coefficient of SUS430 is 10.4E-6/° C., and there is a large difference between them. For this reason, when both are used in a mixed manner, a large thermal stress is generated at a bonding interface, and it is difficult to maintain dimensions of the liquid discharge head with high accuracy. Therefore, it is desirable to select the same kind of stainless alloy for the nozzle plate and the housing as far as possible.

The bonding surface of the metal plates or the bonding surface of the housing is desirably a smooth and clean surface. Since a stainless material for etching is homogeneous and excellent in flatness, it is often used also when the diffusion bonding is performed. On the other hand, in processing the nozzle, the nozzle is generally formed through a half blanking press step and a polishing step. In a case where an inner diameter of a hole of the nozzle is larger than 200 μm, direct drilling is performed, but it is necessary to perform a polishing step such as deburring to remove burrs generated at that time to no small extent. After undergoing such a machining step, particularly a thin nozzle plate component is easily deformed by machining. Examples of the deformation include warpage, folding, a dent, and local deformation. Shape deformation in a case where they are present at the bonding interface is not desirable for the diffusion bonding. This is because the diffusion bonding requires the bonding interface to be flat, but such deformation hinders complete contact of the bonding surface, leading to poor quality such as poor bonding strength and liquid leakage.

During the diffusion bonding, pressure nonuniformity easily occurs at the bonding interface due to the presence of shape deformation, and dimensional accuracy of the nozzle plate is greatly reduced. Therefore, in order to make the bonding pressure more uniform and obtain higher bonding quality, it is necessary to prevent shape deformation on the bonding surface of a bonding component as far as possible.

Comparative Example

Next, problems in diffusion bonding in a configuration to be compared (a comparative example) will be described. Circumstances leading to the present embodiment based on the above will be described. Note that reference numerals of terms are also given again for convenience of description.

Figure 5:
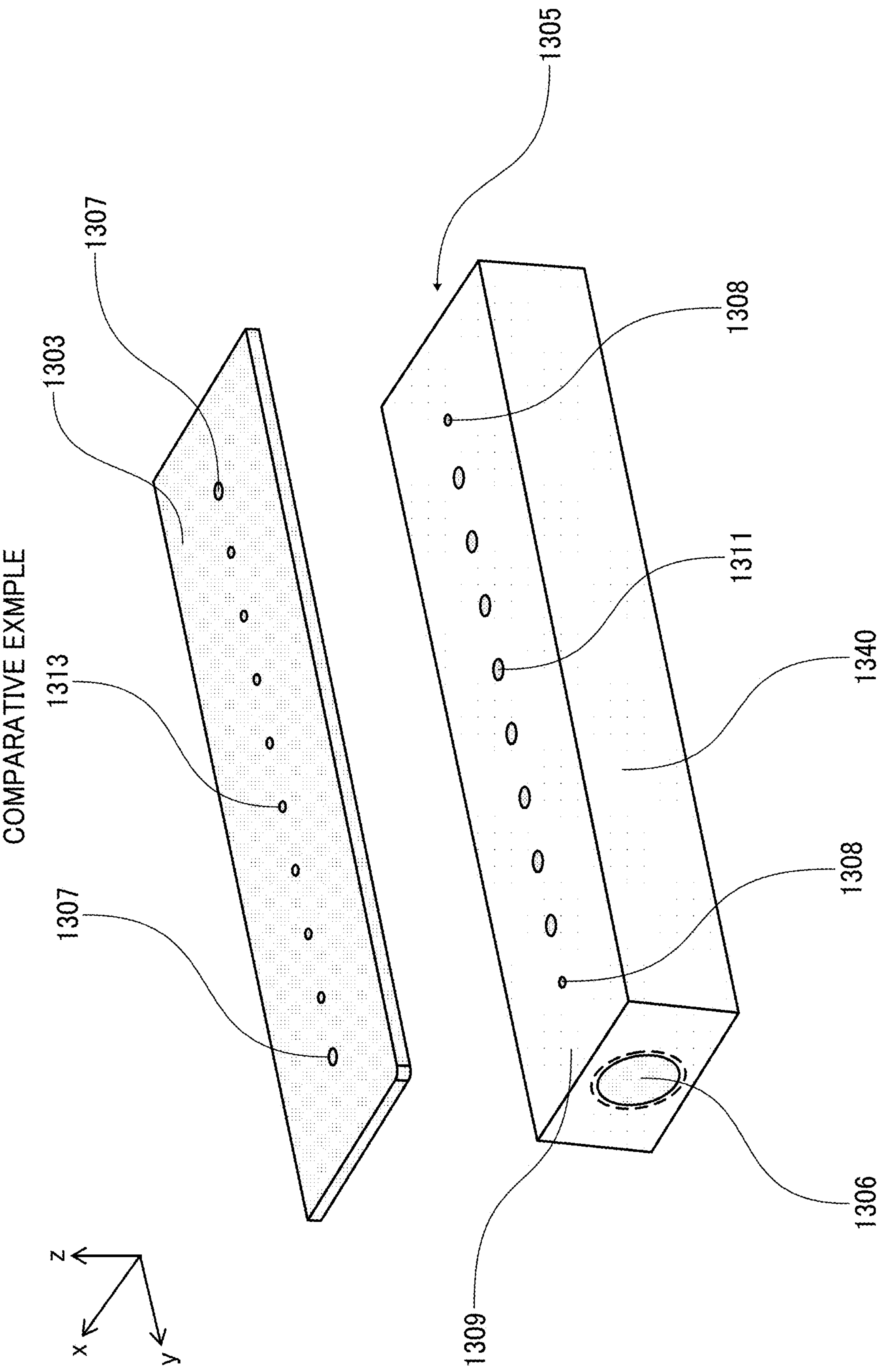
FIG. 5 is a diagram illustrating a configuration according to a comparative example.

FIG. 5 is a diagram illustrating a configuration according to the comparative example. First, the material of a nozzle plate 1303 in the configuration according to the comparative example is ferritic stainless SUS430 (manufactured by JFE Steel Corporation), and the material of a housing 1340 is ferritic stainless SUS430 (manufactured by NIPPON STEEL Stainless Steel Corporation). In other words, the ferritic stainless SUS430 is used for both.

The nozzle plate 1303 has a plate thickness of 0.5 mm and has nozzles 1313, which are eight nozzle holes here. The eight nozzles 1313 are arranged side by side in a longitudinal direction (the y-axis direction in FIG. 5) of the nozzle plate 1303 at predetermined intervals. The nozzle plate 1303 is provided with nozzle positioning holes 1307, which become positioning holes on both sides (both sides in the y-axis direction in FIG. 5) in an arrangement direction of the eight nozzles 1313 during bonding. The inner diameter of a hole of the nozzle 1313 is 0.2 mm, and the inner diameter of the nozzle positioning hole 1307 is 1.0 mm. These holes are processed by drilling, and then burrs and the like formed around openings of the holes in the polishing step are removed. During this removal, a roughness Ra of the bonding surface of the nozzle plate 1303 is set to 0.5 μm or less.

Next, regarding the housing 1340, a bonding surface 1309 of the housing 1340 to the nozzle plate 1303 is flat. In the bonding surface 1309, channels 1311 are arranged side by side in a longitudinal direction of the housing 1340 (the y-axis direction in FIG. 5) at predetermined intervals corresponding to the eight nozzles 1313. Here, the eight channels 1311 are holes having an inner diameter of 3 mm, and communicate with a common channel 2304 provided in a central portion of the housing 1340 to form a path through which a liquid passes. The housing 1340 is provided with housing positioning holes 1308, which become positioning holes on both sides (both sides in the y-axis direction in FIG. 5) in an arrangement direction of the eight channels 1311 during bonding. On the other hand, holes of the housing positioning holes 1308 do not communicate with the common channel 2304 provided in the central portion of the housing 1340. A liquid inflow side is an inlet 1305, and a liquid outflow side is an outlet 1306.

In such a configuration, after positioning was performed through the nozzle positioning holes 1307 and the housing positioning holes 1308, the nozzle plate 1303 and the housing 1340 were integrated and put into a vacuum high-temperature furnace as illustrated in FIGS. 4A and 4B to perform the diffusion bonding. As conditions for the diffusion bonding at this time, the temperature was set to about 1000° C., and the nozzle plate 1303 and the housing 1340 were kept warm for 15 minutes or more, and then cooled in the furnace as they were. A surface pressure at the bonding surface is set to 1 MPa or more, and a degree of vacuum is set to $10^{-3}$ Pa. In a case of the configuration according to the present comparative example, since a bonding area is large, a pressurizing force is adjusted so as to be the above surface pressure.

Here, the diffusion bonding of metal is performed under high temperature and high pressure conditions, but when the bonding area is large, a deformation amount is also large. In the configuration according to the comparative example, since the nozzle plate and the housing are bonded to each other on the substantially entire surface, the bonding area is increased. Therefore, there is a problem that the deformation amount of the nozzle plate is large. To solve such a problem, there is a measure of correcting the deformation amount in advance during design for the deformation amount generated during a diffusion bonding process. However, under high temperature and high pressure conditions, the pressure and temperature are not necessarily uniformly distributed along the components.

In particular, as the deformation amount increases, even if dimension correction is performed, a large variation occurs in the accuracy of the shape dimensions of the discharge head and the accuracy of the distance (a pitch distance) between the nozzles.

On the other hand, in order to prevent such variation, if the bonding area is reduced, the deformation amount is also reduced, and the correction and the like are also possible. Therefore, the present embodiment has been made as follows. This will be described.

Example 1

Figure 6:
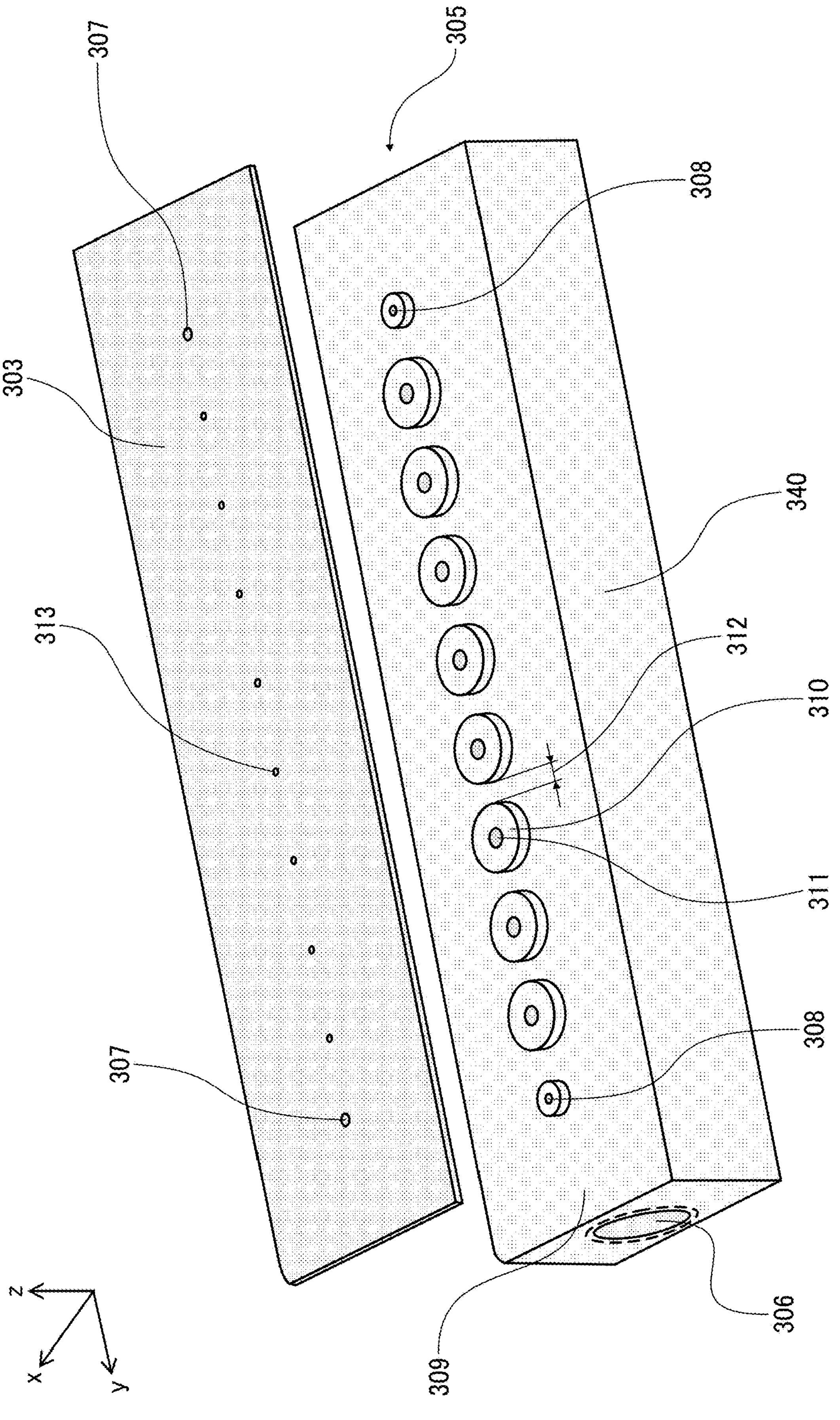
FIG. 6 is a diagram illustrating Embodiment 1 (Example 1) according to the present embodiment.

FIG. 6 is a diagram illustrating Embodiment 1 (Example 1) according to the present embodiment. An embodiment according to the present embodiment will be described below with reference to FIG. 6. In the present embodiment, in view of the above problems, a cylindrical connecting portion is provided on a bonding surface of a housing to a nozzle plate, and then the nozzle plate and the housing are bonded by diffusion bonding. Other configurations are assumed to be the same as those according to the comparative example. Reference numerals of terms are also given again for convenience of description.

First, the configuration according to Example 1 is largely different from the configuration according to the comparative example in that cylindrical connecting portions 310 (an example of the connecting portions) is provided on a bonding surface 309 of a housing 340. Here, the configuration of the connecting portions 310 will be mainly described. Note that it is assumed that other configurations of the housing, the configuration of the nozzle plate, the environmental conditions in the diffusion bonding, and the like in Example 1 are the same as those in the configuration according to the comparative example.

In the present embodiment, as illustrated in FIG. 6, on the bonding surface 309 of the housing 340 to a nozzle plate 303, the cylindrical connecting portions 310 are provided by machining corresponding to the positions of nozzles 313 and nozzle positioning holes 307 of the nozzle plate 303. The connecting portions 310 have a height (a size in the z-axis direction in FIG. 6) of 0.1 mm and an outer diameter of 7 mm. The heights of multiple the connecting portions 310 are all the same. The reason for this is to make the nozzle plate 303 flatter so that the nozzle plate can be bonded to the housing 340. The bonding width of bonding portions of the connecting portions 310 (an example of the width of the bonding portion) is 2 mm in Example 1. In the present embodiment, eight connecting portions 310 are provided.

This is because the number of nozzles 313 is 8 and the number of connecting portions 310 corresponds thereto. The adjacent connecting portions 310 are provided with gaps 312 (an example of the gap) at predetermined intervals, and are arranged side by side in the longitudinal direction of the housing 340 (the y-axis direction in FIG. 6). In Example 1, the gaps 312 are set to 0.1 mm. Each of the eight cylindrical connecting portions 310 is provided with a channel 311 (an example of the channel). The channel 311 is a hole having an inner diameter of 3 mm, and communicates with the common channel 2304 provided in the central portion of the housing 340 to form a path through which a liquid passes. Since the channel 311 is formed inside the connecting portions 310 in this manner, the periphery of the nozzles 313 immediately becomes bonding portions, and deformation due to the internal pressure of the liquid in the channel 311 can be avoided. Therefore, the positions of the nozzles 313 can be maintained with higher accuracy, and at the same time, a long life can be realized. Note that details of specific design values of the connecting portions and the like will be described later.

The housing 340 is provided with housing positioning holes 308 that become positioning holes on both sides (both sides in the y-axis direction in FIG. 6) in an arrangement direction of the eight channels 311 during bonding. In order to improve positioning accuracy, the housing positioning holes 308 are cylindrical connecting portions having the same height as the nozzles 313 (the size in the z-axis direction in FIG. 6) in the embodiment according to the present embodiment. Note that the size of outer diameters of the housing positioning holes 308 is smaller than outer diameters of the connecting portions 310 since strength is not required as much as that of the connecting portions 310. No channels are formed inside the housing positioning holes 308. Therefore, the housing positioning holes 308 do not communicate with the common channel 2304 provided in the central portion of the housing 340. A liquid inflow side is an inlet 305, and a liquid outflow side is an outlet 306.

In such a configuration, after positioning is performed through the nozzle positioning holes 307 and the housing positioning holes 308, the nozzle plate 303 and the housing 340 are integrated and put into a vacuum high-temperature furnace as illustrated in FIGS. 4A and 4B to perform the diffusion bonding. The conditions for the diffusion bonding at this time are the same as those in the comparative example.

Figure 7:
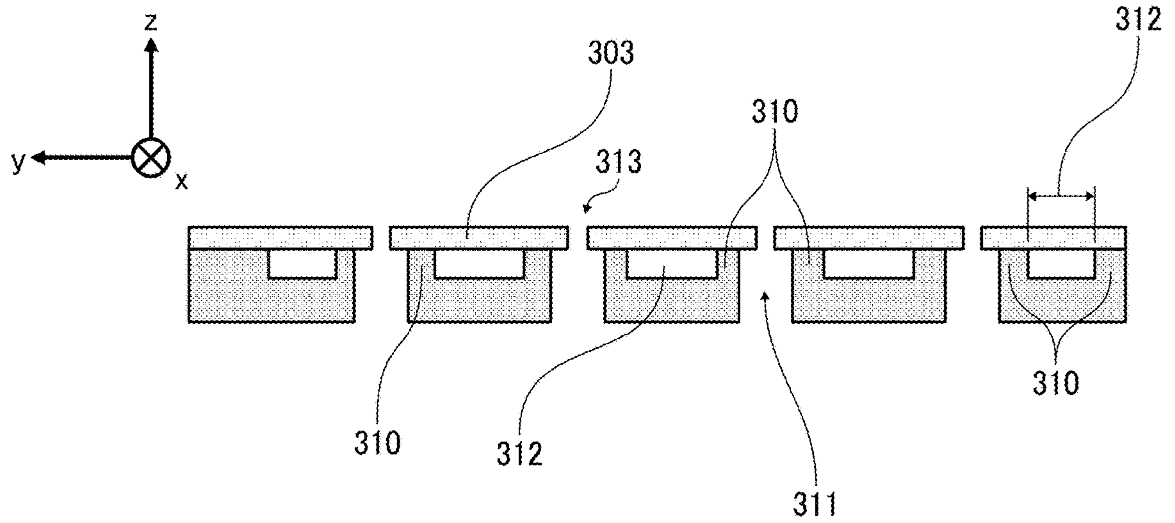
FIG. 7 is a schematic view of a bonding portion of a nozzle plate and a housing of a liquid discharge head according to Example 1.

FIG. 7 is a schematic view of a bonding portion of the nozzle plate and the housing of the liquid discharge head according to Example 1. As can be seen from FIG. 7, the connecting portions 310 are arranged side by side in the longitudinal direction (the y-axis direction in FIG. 7) of the housing 340 with the gaps 312 at predetermined intervals.

Figure 8:
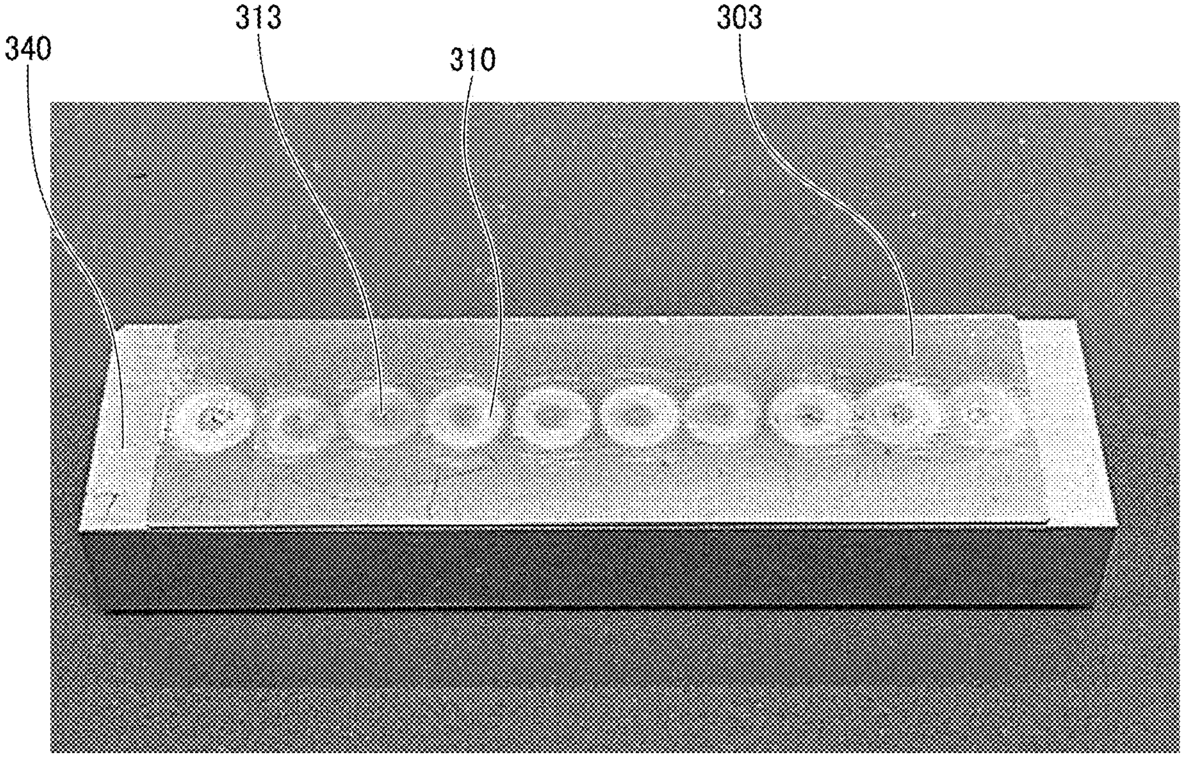
FIG. 8 is an actual photograph of the nozzle plate and the housing bonded to each other by diffusion bonding in the embodiment according to the present embodiment.

FIG. 8 is an actual photograph of the nozzle plate and the housing bonded to each other by diffusion bonding in the embodiment according to the present embodiment. As can be seen from FIG. 8, a ring shape surrounding the periphery of the nozzles 313 is observed on an upper surface of the nozzle plate 303, and this reflects the shape of the connecting portions 310 receiving a pressure during the diffusion bonding. In other words, the diffusion-bonded portions are only portions of the connecting portions. Note that in the present embodiment, the housing positioning holes 308 are configured as cylindrical connecting portions, but in the present embodiment, the connecting portions may not be provided.

[Difference in Displacement Amount Between Example 1 and Comparative Example]

Here, displacement of the position of the nozzle before and after the diffusion bonding of the nozzle plate according to Example 1 and the nozzle plate according to the comparative example will be described. Before the description, the principle of the position of the nozzle before and after the diffusion bonding will be described.

Figure 9A:
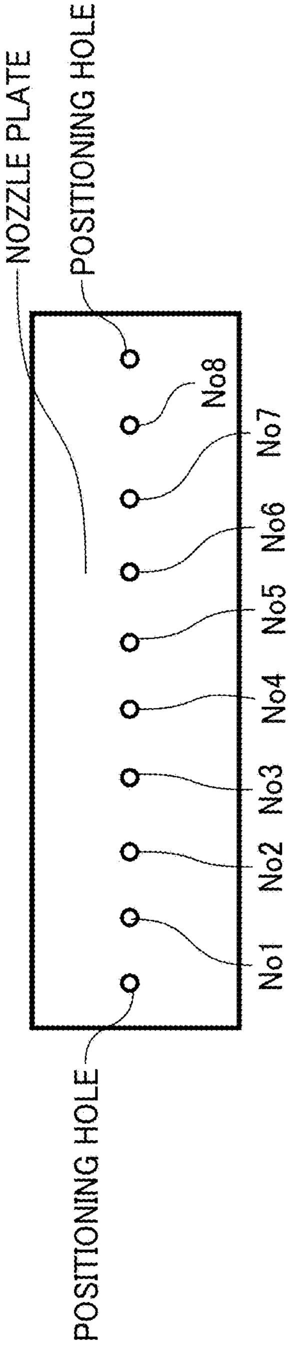
FIGS. 9A to 9C are diagrams illustrating a state in which the position of a nozzle is displaced before and after diffusion bonding.
Figure 9B:
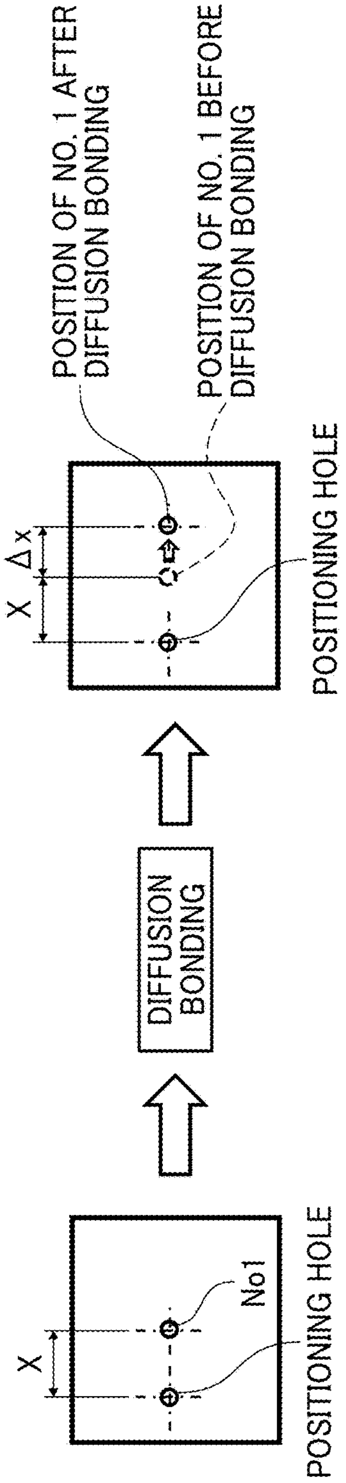
Figure 9C:
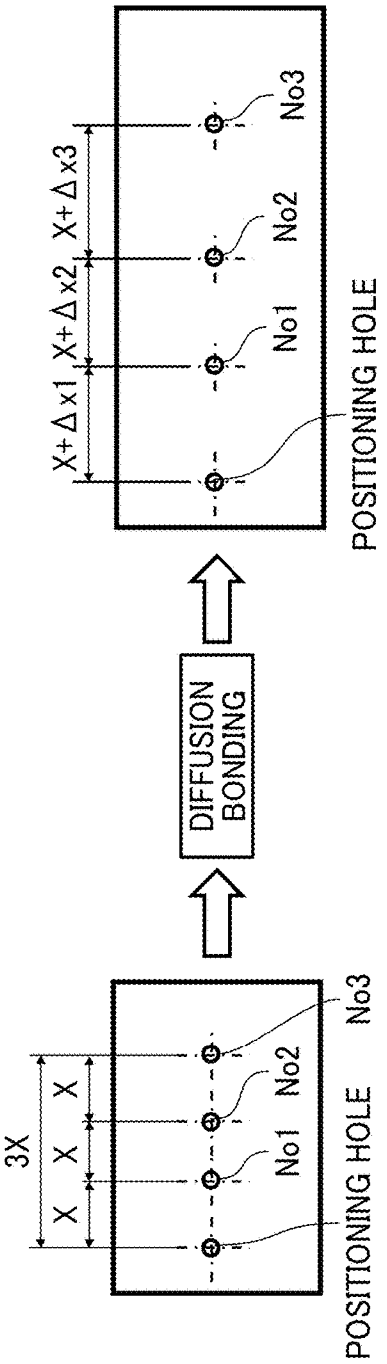

FIGS. 9A to 9C are diagrams illustrating a state in which the position of the nozzle is displaced before and after the diffusion bonding. The principle of displacement of the position of the nozzle after the diffusion bonding will be described with reference to FIGS. 9A to 9C. Note that this principle is the same for the nozzle plate according to Example 1 and the nozzle plate according to the comparative example.

Here, FIG. 9A is a diagram illustrating a configuration of a nozzle plate for describing a displacement amount. The nozzle plate according to FIG. 9A has a configuration in which two positioning holes and eight nozzles (nozzle holes) positioned therebetween are arranged in a line in the longitudinal direction of the nozzle plate. Here, the eight nozzle holes are set to No. 1, No. 2, . . . , No. 8 with a left positioning hole (corresponding to the nozzle positioning holes 1307 in FIG. 5 or the nozzle positioning holes 307 in FIG. 6) as a reference.

Next, FIG. 9B is a diagram illustrating displacement of the No. 1 nozzle illustrated in FIG. 9A before and after the diffusion bonding. First, as illustrated in FIG. 9B, a distance from the left positioning hole of the nozzle plate to the position of the No. 1 nozzle before the diffusion bonding is defined as x. The nozzle plate after the diffusion bonding is under a pressurized and heated environment due to the diffusion bonding, and thus the nozzle plate stretches. As a result, the No. 1 nozzle is positioned at a distance of $x+\Delta x$ obtained by adding $\Delta x$, which is a displacement amount, to x, which is a distance before the diffusion bonding, from the left positioning hole.

Next, FIG. 9C is a diagram illustrating displacement of the multiple nozzles before and after the diffusion bonding illustrated in FIG. 9C. Here, for description, the No. 1 to No. 3 nozzles are described as an example. It is assumed that the nozzles are arranged side by side at equal intervals from the left positioning hole.

First, as illustrated in FIG. 9C, distances from the left positioning hole of the nozzle plate to the position of each nozzle before the diffusion bonding are defined as x, 2x, and 3x. As illustrated in FIG. 9C, a displacement amount "between the positioning hole and the No. 1 nozzle" is $\Delta x1$, a displacement amount "between the No. 1 nozzle and the No. 2 nozzle" is $\Delta x2$, and a displacement amount "between the No. 2 nozzle and the No. 3 nozzle" is $\Delta x3$. The nozzle plate after the diffusion bonding stretches by the diffusion bonding. As a result, the No. 1 nozzle is positioned at a distance of $x+\Delta x1$ obtained by adding $\Delta x1$, which is a displacement amount, to x, which is a distance before the diffusion bonding, from the left positioning hole. The No. 2 nozzle is positioned at a distance of $2x+\Delta x1+\Delta x2$ obtained by adding $\Delta x1$ and $\Delta x2$ to 2x, which are displacement amounts, to x, which is a distance before the diffusion bonding from the left positioning hole. The No. 3 nozzle is positioned at a distance of $3x+\Delta x1+\Delta x2+\Delta x3$ obtained by adding $\Delta x1+\Delta x2+\Delta x3$, which is a displacement amount, to 3x, which is a distance before the diffusion bonding, from the left positioning hole.

Here, the position of the No. 1 nozzle after the diffusion bonding is separated from the positioning hole by a distance of the displacement amount $\Delta x1$ compared with that before the diffusion bonding. Similarly, it can be seen that the position of the No. 2 nozzle after the diffusion bonding is separated from the positioning hole by a distance of the displacement amount $\Delta x1+\Delta x2$ compared with that before the diffusion bonding, and the position of the No. 3 nozzle the after diffusion bonding is separated from the positioning hole by a distance of the displacement amount $\Delta x1+\Delta x2+\Delta x3$ compared with that before the diffusion bonding. In other words, after the diffusion bonding, the displacement amount at a certain number is a cumulative value (a cumulative elongation amount) of the displacement amount between the nozzles until the nozzle of the number is positioned with the positioning hole as a reference. Therefore, the displacement amount increases as the distance of the nozzle from the positioning hole increases.

Figure 10:
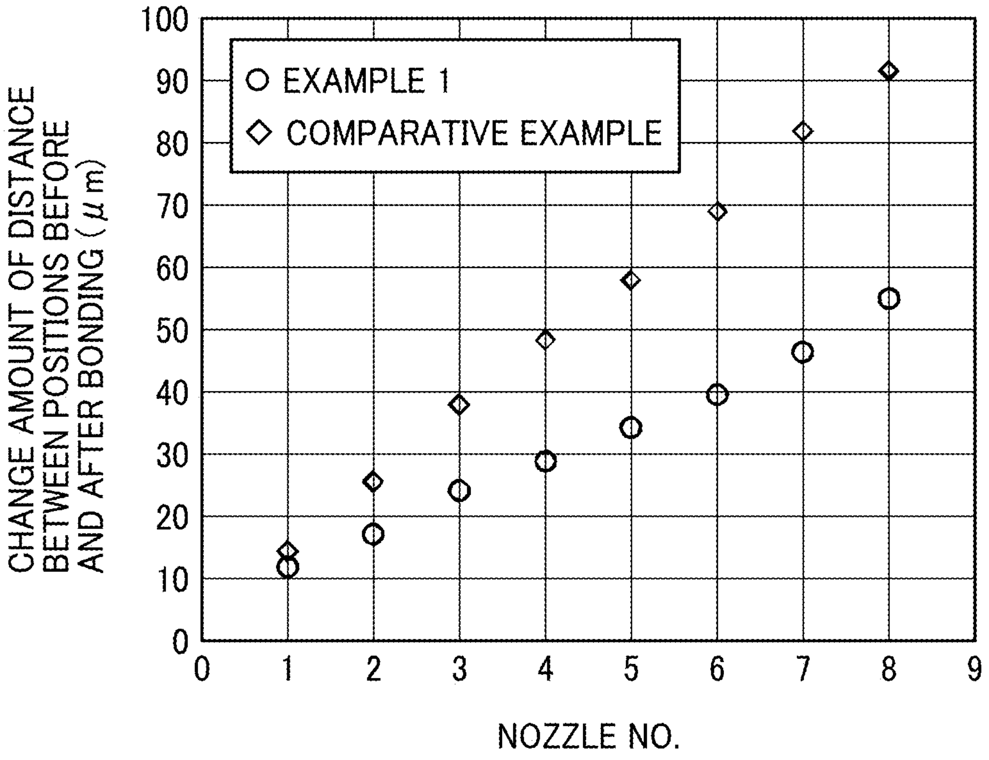
FIG. 10 is a graph illustrating results of measuring a difference in displacement amount of a distance between positions before and after diffusion bonding with respect to the nozzle plates according to Example 1 and the comparative example.

On the premise of this principle, a result of measuring a difference in displacement amount of a distance between positions before and after the diffusion bonding for the nozzle plates according to Example 1 and according to the comparative example will be described below. FIG. 10 is a diagram illustrating a result of measuring a difference in displacement amount of a distance between positions before and after the diffusion bonding for the nozzle plates according to Example 1 and the comparative example. First, before the diffusion bonding, the position of each nozzle was measured in advance with the positioning hole (of the nozzle plate) as a reference. After the diffusion bonding, each nozzle position was measured again from the positioning hole, and a change amount before and after the bonding was evaluated. FIG. 10 illustrates evaluation results.

FIG. 10 illustrates the change amount of each nozzle position for multiple nozzles arranged along a reference line that is a straight line connecting two positioning holes. FIG. 10 illustrates results of the change amount of the nozzle plate according to Example 1 and the change amount of the nozzle plate according to the comparative example. For the nozzle plate, a nozzle plate having eight nozzles as illustrated in FIGS. 9A to 9C is used in both Example 1 and the comparative example. It is assumed that evaluation conditions such as an environment in the diffusion bonding are the same in both Example 1 and the comparative example.

As illustrated in FIG. 10, the displacement amount increases as the distance from the positioning hole to the nozzle position increases. For example, the cumulative value of the displacement amount of the No. 3 nozzle is larger than those of No. 1 and No. 2. It can be seen that the displacement amount of the No. 8 nozzle at a position farthest from the positioning hole is the largest compared with the displacement amounts of the other nozzles. This is because this is based on the principle described in FIGS. 9A to 9C.

Here, when comparing the results of Example 1 with the results of the comparative example, it is found that the displacement amount of Example 1 is smaller than the displacement amount of the comparative example for any nozzle. For example, regarding the displacement amount of the No. 3 nozzle, the displacement amount of Example 1 is smaller than the displacement amount of the comparative example. As another example, the displacement amount of the No. 8 nozzle at the position farthest from the positioning hole in Example 1 is smaller than the displacement amount of the comparative example.

The reason why such evaluation results have been obtained is that the configuration according to Example 1 is provided with cylindrical connecting portions, whereby an area where the nozzle plate and the housing are bonded is smaller than that of the configuration according to the comparative example. In other words, in a case where the diffusion bonding is performed under the same environment for the configuration according to Example 1 and the configuration according to the comparative example, the bonding area is reduced by providing the connecting portions having the gap, whereby the change amount (an elongation amount) of the distance between the nozzles provided in the nozzle plate can be suppressed.

In the evaluation described above, 10 samples were prepared for each of the nozzle plate according to Example 1 and the nozzle plate according to the comparative example, and a change range of the elongation amount of the No. 8 nozzle of each sample was measured and evaluated. Then, a difference (max−min) between a minimum value (min) and a maximum value (max) of each measured value was calculated, and the calculated amount was defined as a change range of the elongation amount. The evaluation results are illustrated in Table 1. As illustrated in Table 1, as a result, it was confirmed that the change range of the elongation amount of Example 1 correspondingly decreased to about 60% of the change range of the elongation amount of the comparative example.

TABLE 1

| | Change range of elongation amount (μm) |
|---|---|
| Example 1 | 19.3 |
| Comparative example | 28.4 |

[Specific Setting Value of Connecting Portion]

Next, a specific setting value of the connecting portion of Example 1 will be described. In the connecting portions 310 in the configuration according to Example 1 described above, it can be said that it is desirable to reduce the area of the bonding portion as much as possible in consideration of suppressing the elongation amount (the change amount) of the nozzle plate 303. On the other hand, reducing the bonding area also leads to a decrease in bonding strength. In particular, opening and closing of the nozzle is controlled by a valve body, such as a needle valve, but in a case where the internal pressure of the liquid in the liquid chamber is very high, it is necessary to secure a certain bonding strength from the viewpoint of product safety.

Figure 11B:
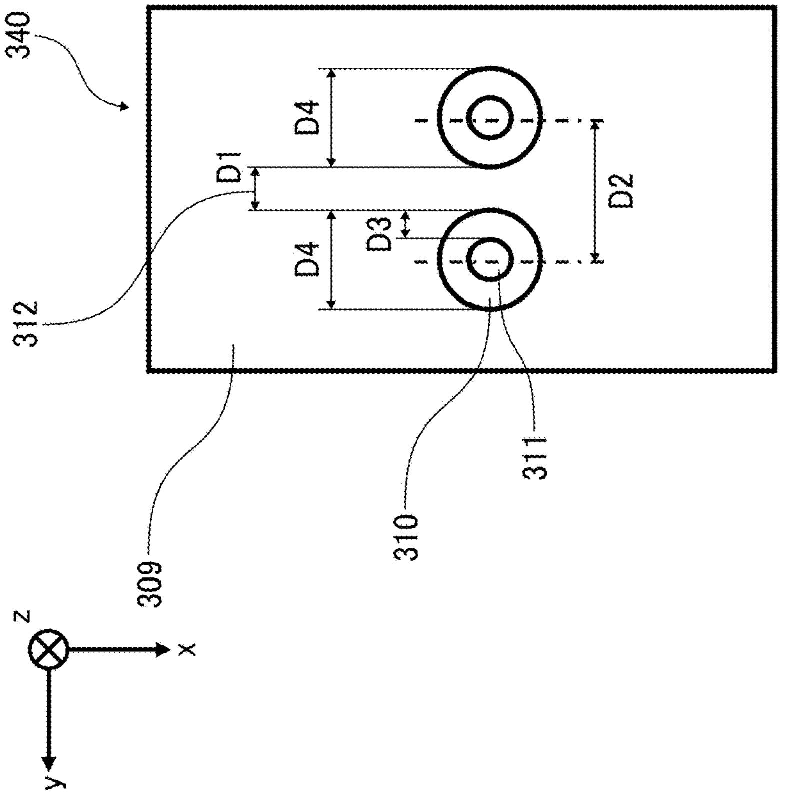
FIGS. 11A and 11B are diagrams for describing a setting value of a connecting portion according to Example 1.
Figure 11A:
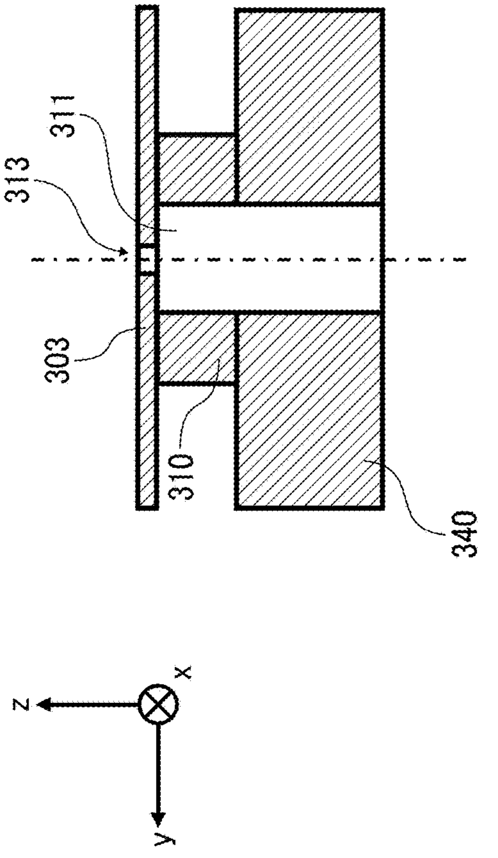

FIGS. 11A and 11B are diagrams for describing a setting value of the connecting portion according to Example 1. A specific design method and setting value of the shape of the connecting portion according to Example 1 will be described with reference to FIGS. 11A and 11B.

First, FIG. 11A is a cross-sectional view of a connecting portion bonded to a nozzle plate. When the nozzle plate 303 is bonded to the connecting portions 310, the shape formed by the connecting portions 310, the channel 311, and the nozzle plate 303 can approximate the shape of a kind of pressure vessel. As illustrated in FIG. 11A, since the connecting portions 310 have a cylindrical shape, the bonding width to the nozzle plate 303 corresponds to the plate thickness of the pressure vessel. As a calculation formula of the plate thickness of the pressure vessel, those illustrated in Annex 1 (normative) "Shells and heads of pressure vessels" of JIS B 8265 "Construction of pressure vessel—General principles" 1) are used.

Here, a thin-walled structure almost applies when a thickness is sufficiently smaller than the diameter. The design pressure is less than 30 MPa, the basis of an allowable tensile stress is ¼ of the tensile strength, and setting standards of the allowable tensile stress of a creep range is also defined. In other words, a safety factor of 4 is determined to be necessary. In a case of a cylindrical shape (a model of a cylindrical shell) such as the connecting portion according to Example 1, a minimum plate thickness t is expressed by the following Math 1 (a plate thickness calculation formula of a pressure vessel).

$$t = \frac{PD_i}{2S\eta - 1.2P} + C$$ [Math 1]

Here, P is a design pressure, Di is an inner diameter, S is an allowable tensile strength of a material, η is a joint efficiency factor, and C is a corrosion allowance.

In a case of the connecting portion according to Example 1, SUS430 is used as a material, the tensile strength is 420 MPa in this case, and when a safety coefficient is 4, the allowable tensile strength S is 105 MPa. At a design pressure of 10 MPa, when the inner diameter Di is 3 mm, the joint efficiency coefficient η is 0.2, and the corrosion allowance is 0, a calculation result is obtained in which the minimum plate thickness t is 0.2 mm. In other words, when the bonding width of the connecting portions 310 or the thickness of the nozzle plate 303 is 0.2 mm or more, safety can be secured. In a case of the connecting portions 310 according to Example 1, the plate thickness of the nozzle plate 303 was set to 0.5 mm, and the bonding width of the connecting portions 310 was set to 2 mm and 10 times from the viewpoint of securing the strength, so that the bonding strength of the diffusion bonding could be secured more reliably.

In order to reduce the elongation amount of the nozzle plate 303, it is desirable to make the gap 312 as large as possible. Therefore, next, a setting value of the gap 312 according to Example 1 will be described. FIG. 11B is a diagram for explaining setting of the gap of the connecting portion according to Example 1. Here, the distance between outer diameter end portions of the adjacent connecting portions 310 (a size of the gap 312) is D1, the distance between the positions of the channels 311 corresponding to the nozzles 313 (a distance corresponding to the nozzle pitch) is D2, the width of the bonding portion of the connecting portions 310 is D3, the outer diameter of the connecting portions 310 is D4, and the inner diameter of the connecting portions 310 is Di=(D4−2×D3) as described above. In consideration of the elongation amount of the nozzle plate 303, it is desirable to increase the size of the gap 312, but on the other hand, it is necessary to consider the minimum bonding width of the connecting portions 310 from the viewpoint of securing the strength. Therefore, it is assumed that Expression (A): "0<D1<; D2−2×minimum bonding width−Di" is satisfied. By using this Expression (A), it is possible to obtain how large the gap 312 should be.

In practice, a lower limit value of the gap 312 is appropriately set according to the number of nozzles (a cumulative pitch) and the required positional accuracy based on Expression (A). Based on this, in Example 1, the gap 312 was set to 1 mm as described above. Therefore, in a case where the positional accuracy is improved, or in a case where the number of nozzles is large, the gap 312 may be made larger than 1 mm within a range that satisfies Expression (A). For example, in a case where the positional accuracy is set to ½, the size of the gap 312 is set to 2 mm, and in a case where the number of nozzles is doubled, the gap is set to 2 mm.

As described above, the connecting portion having the gap is provided to bond the nozzle plate and the housing. The nozzle plate and the housing are not bonded to each other on the entire surface but are discontinuously divided, so that the area of a portion to be bonded can be reduced, the elongation amount (the deformation amount) of the nozzle plate under high temperature and high pressure in metal diffusion bonding can be suppressed, and a more accurate dimension can be obtained. By setting the bonding width of the connecting portion to be at least equal to or larger than the minimum plate thickness required for (that can withstand) the design pressure to be used, the bonding strength can be reliably secured.

As described above, in the present embodiment, the liquid discharge head 1 includes: the nozzle plate 303 having the multiple nozzle holes 313 that discharges a liquid; the housing 340 that supports the nozzle plate 303 and is bonded to the nozzle plate 303 by a step including diffusion bonding; the multiple connecting portions 310 that is formed in the housing 340, is brought into contact with the nozzle plate 303 and the housing 340 to bond the nozzle plate 303 and the housing 340, and is arranged in the arrangement direction of the nozzle holes 313; a channel 311 that is formed in the connecting portions 310 and communicates with the nozzle holes 313 of the nozzle plate 303; and a gap 312 formed between the connecting portions 310 adjacent to one another.

As a result, the positional accuracy of the nozzles 313 and the like can be improved in a case of bonding by the diffusion bonding.

As described above, in the present embodiment, the connecting portions 310 have a bonding portion that is a part surrounding the channel 311, and the width of the bonding portion is at least equal to or larger than the minimum plate thickness required for (that can withstand) the pressure applied to the nozzle plate 303.

As a result, it is possible to reliably guarantee the bonding strength of the diffusion bonding, improve the durability against the internal pressure of the liquid in the channel, suppress peeling of the bonding portion, and maintain the shape of the liquid discharge head including the nozzle plate.

As described above, in the present embodiment, the nozzle plate 303 and the housing 340 are formed of any of an austenitic stainless alloy, a ferritic stainless alloy, and a martensitic stainless alloy.

As a result, sufficient strength to withstand the internal pressure of the liquid in the channel can be provided, and the strength of the liquid discharge head can be secured. The ink resistance and the corrosion resistance can be obtained.

As described above, in the present embodiment, the nozzle plate 303 and the housing 340 are made of the same material.

As a result, this makes it possible to prevent a large thermal stress from being generated at the bonding interface and to maintain the dimensions of the liquid discharge head with high accuracy.

As described above, in the present embodiment, when the distance from the housing 340 to the nozzle plate 303 in the connecting portions 310 is defined as heights of the connecting portions 310, the heights of the multiple connecting portions 310 are the same.

As a result, the nozzle plate can be made flatter and bonded to the housing.

Example 2

Figure 12:
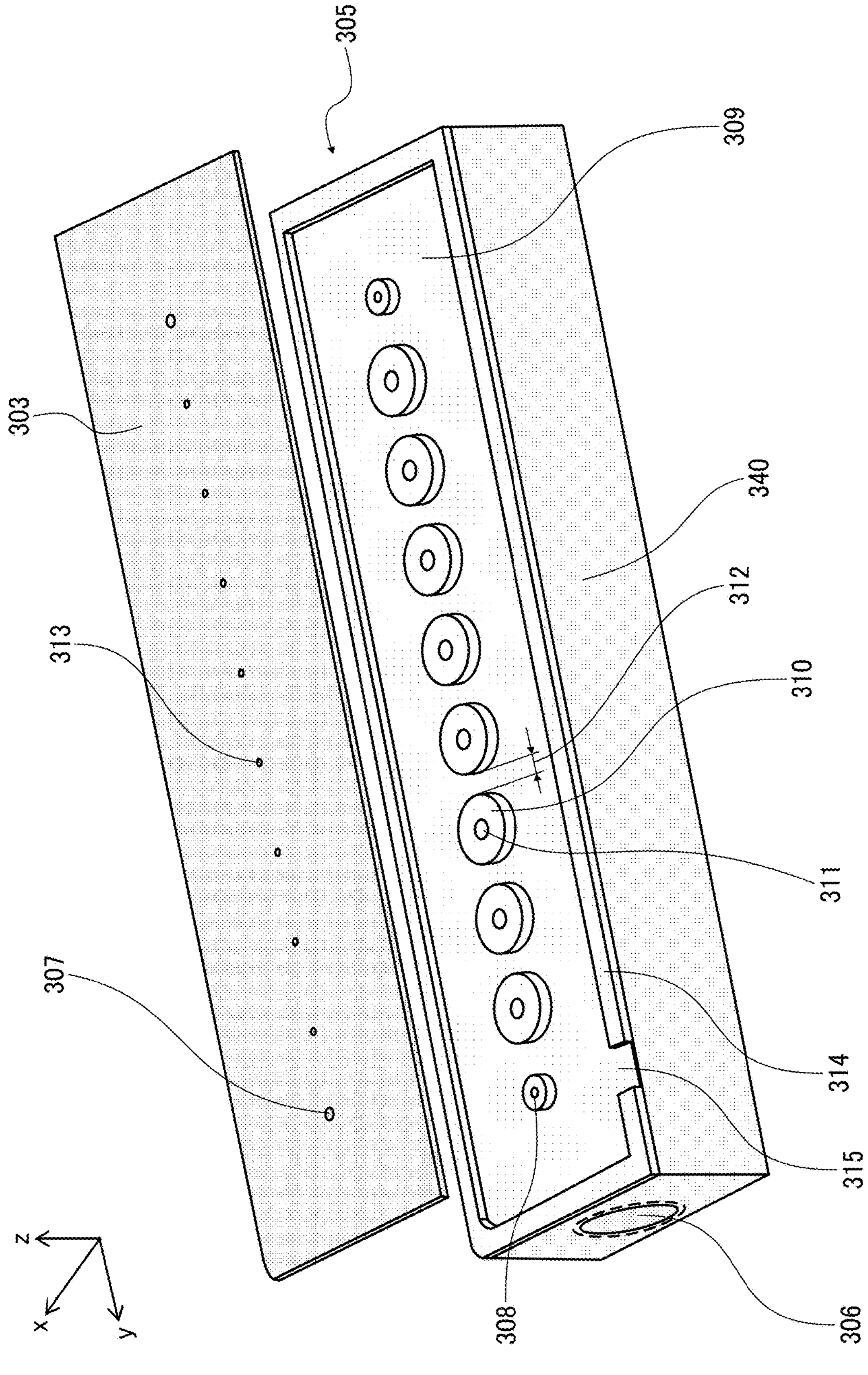
FIG. 12 is a diagram illustrating Embodiment 2 (Example 2) according to the present embodiment.

FIG. 12 is a diagram illustrating Embodiment 2 (Example 2) according to the present embodiment. The embodiment according to the present embodiment will be described below with reference to FIG. 12.

The present example is different from Example 1 in that a wall portion is provided on an outer edge portion (a peripheral edge portion) of a housing for bonding to a nozzle plate, and then a manufacturing method is adopted in which the nozzle plate and the housing are bonded by diffusion bonding. Note that other configurations are assumed to be the same as those according to Example 1. Therefore, differences from Example 1 will be mainly described below.

In the configuration according to Example 2 illustrated in FIG. 12, a wall portion (a partition wall) 314 for bonding to the nozzle plate 303 is provided on a bonding surface 309 of the housing 340 and on a peripheral edge portion of the housing 340. This configuration according to Example 2 is greatly different from that according to Example 1 in this point.

Here, the configuration according to Example 2 includes the wall portion 314 (an example of the wall portion) and the connecting portions 310 including the channel 311 communicating with the nozzle 313 as in Example 1. The wall portion 314 has the same height (the size in the z-axis direction) as the connecting portions 310, which is 0.1 mm.

In this way, the nozzle plate 303 can be made flatter and bonded to the housing 340. The wall portion 314 has a bonding width of 1 mm. In the configuration according to Example 2, the wall portion 314 has a part where a wall portion communication portion 315 which is a hole communicating with outside air is formed.

Thus, the liquid discharge head includes a wall portion 314 formed on one of: an outer peripheral portion of the nozzle plate 303; or an outer peripheral portion of the housing 340, and the wall portion 314 contacts the nozzle plate 303 and the housing 340 to bond the nozzle plate 303 and the housing 340.

In such a configuration, after positioning was performed through the nozzle positioning holes 307 and the housing positioning holes 308, the nozzle plate 303 and the housing 340 were integrated and put into a vacuum high-temperature furnace as illustrated in FIGS. 4A and 4B to perform the diffusion bonding. Note that the conditions for the diffusion bonding at this time are the same as those in Example 1.

By bonding the peripheral edge portion of the nozzle plate 303 to the housing 340 with the wall portion 314, a vacuum is drawn through the wall portion communication portion 315 so that the gaps 312 in adjacent portions of the connecting portions 310 does not become a closed space. Note that two or more wall portion communication portions 315 may be provided. As described above, by providing at least one or more holes communicating with the outside air on the side surface of the wall portion, the space having the gap in the adjacent portions of the connecting portions does not become a space that is closed (a closed space) during the diffusion bonding in vacuum, and air inside can be reliably released. Therefore, when a laminate of the nozzle plate and the housing is heated, the air in the gap in the adjacent portions of the connecting portions does not expand, and it is possible to prevent a bonding failure in the nozzle plate and the like and the occurrence of distortion due to non-uniform temperature distribution of the laminate. Since the diffusion bonding was performed through such a process, trapped air could be sufficiently exhausted, and the outer edge portion (the peripheral edge portion) of the nozzle plate 303 could be reliably bonded to the housing 340 with the wall portion 314 in addition to the connecting portions 310.

In the liquid discharge head thus produced, the elongation amount of the distance from the nozzle plate positioning holes 307 to each nozzle 313 was substantially the same as in Example 1.

Here, in a case where the outer edge portion (the peripheral edge portion) of the nozzle plate is not bonded to the housing, the outer edge portion may be easily caught by a brush, a rubber roller, or the like of a cleaning tool during wiping cleaning and may be turned up.

Therefore, in Example 2, by providing the wall portion on the outer edge portion (the peripheral edge portion) of the housing, the outer edge portion (the peripheral edge portion) of the nozzle is bonded and supported by the housing, so that turning-up of the nozzle plate occurring during wiping cleaning is also suppressed. As a result, life of the discharge head can be greatly extended compared with the case of Example 1.

As described above, the present embodiment includes the wall portion 314 that is formed on the outer edge portion of the housing 340 and is brought into contact with the nozzle plate 303 and the housing 340 to bond the nozzle plate 303 and the housing 340.

As a result, since the outer edge portion (the peripheral edge portion) of the nozzle is bonded and supported by the housing, the turning-up of the nozzle plate occurring during the wiping cleaning is also suppressed.

As described above, in the present embodiment, when the distance from the housing 340 to the nozzle plate 303 in the connecting portions 310 is defined as a height, the nozzle plate 303 is bonded and supported by the connecting portions 310 and the wall portion 314 having the same height as the connecting portions 310, and at least one or more hole portions 315 communicating with the outside of the housing 340 is provided on the side surface of the wall portion 314.

As a result, during the diffusion bonding in vacuum, the space having the gap in the adjacent portions of the connecting portions does not become a space that is closed (a closed space), and the air inside can be reliably released. Therefore, when the laminate of the nozzle plate and the housing is heated, the air in the gap in the adjacent portions of the connecting portions does not expand, and it is possible to prevent a bonding failure in the nozzle plate and the like and the occurrence of distortion due to non-uniform temperature distribution of the laminate.

Example 3

Figure 13:
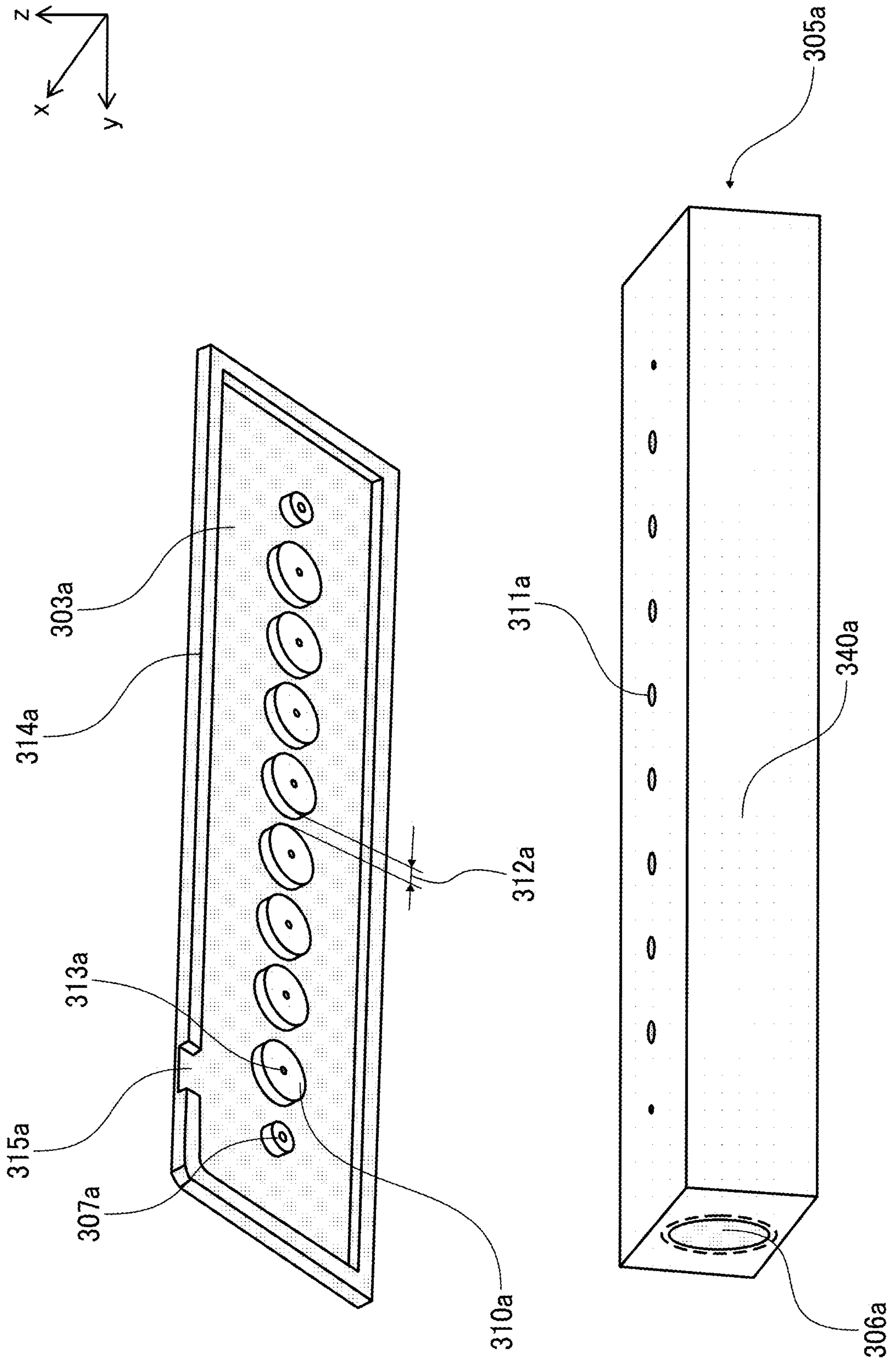
FIG. 13 is a diagram illustrating Embodiment 3 (Example 3) according to the present embodiment.

FIG. 13 is a diagram illustrating Embodiment 3 (Example 3) according to the present embodiment. The embodiment according to the present embodiment will be described below with reference to FIG. 13.

The present example is different from Example 1 in that the connecting portions for diffusion bonding and the wall portion for the bonding are provided not on the housing side but on the nozzle plate side, and then the nozzle plate and the housing are bonded by the diffusion bonding. Note that other configurations are assumed to be the same as those according to Example 1. Therefore, differences from Example 1 will be mainly described below. Note that reference numerals of terms are also given again for convenience of description.

The configuration according to Example 3 illustrated in FIG. 13 is greatly different from the configuration according to Example 1 in that cylindrical connecting portions 310*a* are provided at a position corresponding to a nozzle 313*a* of a nozzle plate 303*a* and a wall portion (a partition wall) 314*a* for bonding to a housing 340*a* is provided on an outer edge portion (a peripheral edge portion) of the nozzle plate 313*a*. In the present embodiment, eight connecting portions 310*a* are provided. This is because the number of nozzles 303*a* is 8 and the number of connecting portions 310*a* corresponds thereto.

The adjacent connecting portions 310*a* are provided with gaps 312*a* at predetermined intervals, and are arranged side by side in the longitudinal direction of the nozzle plate 303 (the y-axis direction in FIG. 13). The wall portion 314*a* has a part where a wall portion communication portion 315*a* which is a hole communicating with outside air is formed. The wall portion communication portion 315*a* is provided to draw vacuum through the wall portion communication portion 315*a* so that the gaps 312*a* in the adjacent portions of the connecting portions 310*a* does not become a closed space during the diffusion bonding.

In such a configuration, after the positioning was performed through nozzle positioning holes 307*a* and housing positioning holes 308*a*, the nozzle plate 303*a* and the housing 340*a* were integrated and placed in a vacuum high-temperature furnace as illustrated in FIGS. 4A and 4B to perform the diffusion bonding. Note that the conditions for the diffusion bonding at this time are the same as those in Example 1 and the like.

In the liquid discharge head thus produced, the elongation amount of the distance from the nozzle plate positioning holes 307*a* to each nozzle 313*a* could be suppressed compared with the configuration according to the comparative example.

Here, in a case where a connecting portion or a wall portion for diffusion bonding is provided on the housing side, the connecting portion or the wall portion is first formed on the housing side mainly by machining. On the other hand, in a case where the number of products is large, it is very costly to produce all of them by machining. Therefore, as in the present example (Example 3), in a case where the connecting portion and the wall portion for diffusion bonding are provided on the nozzle plate side, it is possible to realize the connecting portion or the wall portion by an etching method, so that it is possible to produce a large amount and to suppress costs.

As described above, in the present embodiment, the liquid discharge head 10 includes: the nozzle plate 303*a* having the multiple nozzles 313*a* that discharges a liquid; the housing 340*a* that supports the nozzle plate 303*a* and is bonded to the nozzle plate 303*a* by a step including the diffusion bonding; the multiple connecting portions 310*a* that is formed in the nozzle plate 303*a*, is brought into contact with the nozzle plate 303*a* and the housing 340*a* to bond the nozzle plate 303*a* and the housing 340*a*, and is arranged in the arrangement direction of the nozzles 313*a*; the channel 311*a* that is formed in the connecting portions 310*a* and communicates with the nozzles 313*a* of the nozzle plate 303*a*; and the gap 312*a* formed between the connecting portions 310*a* adjacent to one another.

As a result, in a case where the connecting portion or the wall portion for diffusion bonding is provided on the nozzle plate side, it is possible to realize the connecting portion or the wall portion by an etching method, and thus, it is possible to produce a large amount and to suppress costs.

As described above, the present embodiment includes the wall portion 314*a* that is formed on the outer edge portion of the nozzle plate 303*a* and is brought into contact with the nozzle plate 303*a* and the housing 340*a* to bond the nozzle plate 303*a* and the housing 340*a*.

As a result, since the outer edge portion (the peripheral edge portion) of the nozzle is bonded and supported by the housing, turning-up of the nozzle plate occurring during wiping cleaning is also suppressed.

As described above, in the present embodiment, when the distance from the housing 340*a* to the nozzle plate 303*a* in the connecting portions 310*a* is defined as a height, the nozzle plate 303*a* is bonded and supported by the connecting portions 310*a* and the wall portions 314*a* having the same height as the connecting portions 310*a*, and at least one or more hole portions 315*a* communicating with the outside of the housing 340*a* is provided on the side surface of the wall portion 314*a*.

As a result, during the diffusion bonding in vacuum, the space having the gap in the adjacent portions of the connecting portions does not become a space that is closed (a closed space), and the air inside can be reliably released. Therefore, when a laminate of the nozzle plate and the housing is heated, the air in the gap in the adjacent portions of the connecting portions does not expand, and it is possible to prevent a bonding failure in the nozzle plate and the like and the occurrence of distortion due to non-uniform temperature distribution of the laminate.

Example 4

Figure 14:
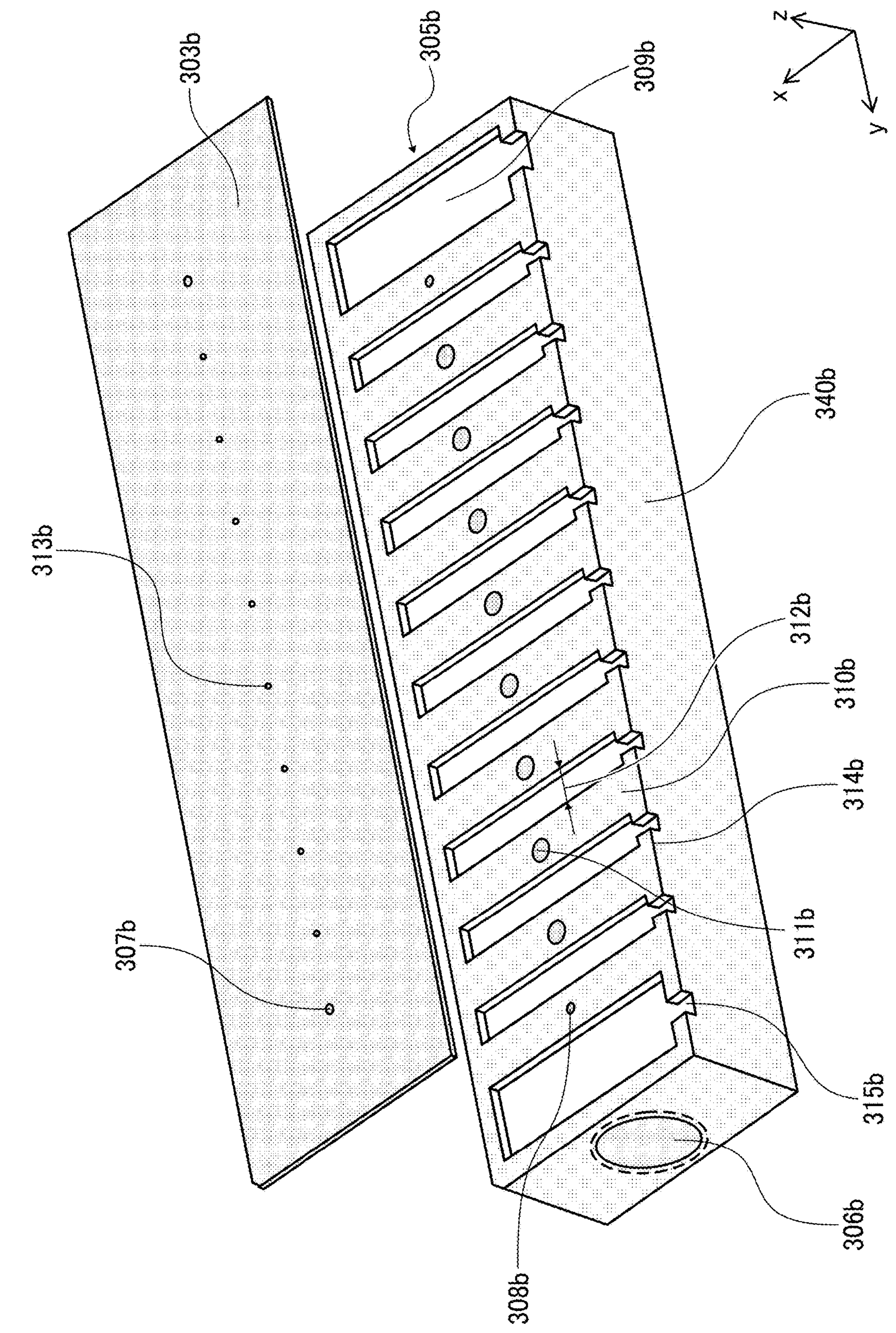
FIG. 14 is a diagram illustrating Embodiment 4 (Example 4) according to the present embodiment.

FIG. 14 is a diagram illustrating Embodiment 4 (Example 4) according to the present embodiment. The embodiment according to the present embodiment will be described below with reference to FIG. 14.

The present example is different from Example 1 in that connecting portion for diffusion bonding and a wall portion for bonding are provided on a housing side, the connecting portions and a part of the wall portion are bonded (connected), and a manufacturing method is adopted in which the nozzle plate and the housing are bonded by the diffusion bonding. Note that other configurations are assumed to be the same as those according to Example 1. Therefore, differences from Example 1 will be mainly described below. Note that reference numerals of terms are also given again for convenience of description.

First, in the present embodiment, as illustrated in FIG. 14, a connecting portion forming surface 309*b* of the housing 340*b* with the nozzle plate 303*b* is provided with rectangular connecting portions 310*b* corresponding to the positions of nozzles 313*b* and nozzle plate positioning holes 307*b* of a nozzle plate 303*b*.

In the present embodiment, eight connecting portions 310*b* are provided. This is because the number of nozzles 303*b* is 8 and the number of connecting portions 310*b* corresponds thereto. The adjacent connecting portions 310*b* are provided with gaps 312*b* at predetermined intervals, and are arranged side by side in the longitudinal direction (the y-axis direction in FIG. 14) of the housing 340*b*.

In the present embodiment, a wall portion (a partition wall) 314*b* for bonding to the nozzle plate 303 is provided on a connecting portion forming surface 309*b* of the housing 340*b* and on a peripheral edge portion of the housing 304*b*. Here, the connecting portions 310*b* including channels 311*b* communicating with the nozzle holes 313*b* are provided. The wall portion 314*b* is partially provided with a wall portion communication portion 315*b* that is a hole communicating with outside air.

The rectangular connecting portions 310*b* are connected to a part of the wall portion 314*b* at an end portion thereof in the longitudinal direction (the x-axis direction in FIG. 14). In the present embodiment, the connecting portions 310*b* are connected to the wall portion 314*b* in this manner, but in the present embodiment, the configuration in which the connecting portions 310*b* are not connected to the wall portion 314*b* is also applicable.

Each of the eight rectangular connecting portions 310*b* is provided with a channel 311*b*. The channel 311*b* communicates with the common channel 2304 provided in the central portion of the housing 340*b* to form a path through which a liquid passes. In the housing 340*b*, housing positioning holes 308*b* that are positioning holes during bonding are provided on both sides of the eight channels 311*b* in the y-axis direction in FIG. 14. No channel is formed inside the housing positioning holes 308*b*. Therefore, the housing positioning holes 308*b* does not communicate with the common channel 2304 provided in the central portion of the housing 340*b*. A liquid inflow side is an inlet 305*b*, and a liquid outflow side is an outlet 306*b*.

In the present embodiment, the rectangular connecting portions 310*b* are connected to a part of the wall portion 314*b* at the end portion in the longitudinal direction (the x-axis direction in FIG. 14), but since the gap 312*b* is provided at least in the arrangement direction of the connecting portions 310*b* having a large deformation amount, it is possible to suppress the elongation amount of the nozzle plate 303*b* compared with the configuration according to the comparative example, for example.

In such a configuration, after positioning was performed through the nozzle positioning holes 307*b* and the housing positioning holes 308*b*, the nozzle plate 303*b* and the housing 340*b* were integrated and put into a vacuum high-temperature furnace as illustrated in FIGS. 4A and 4B to perform the diffusion bonding. Note that the conditions for the diffusion bonding at this time are the same as those in Example 1 and the like.

In the liquid discharge head thus produced, the elongation amount of the distance from the nozzle plate positioning holes 307*b* to each nozzle 313*b* could be suppressed compared with the configuration according to the comparative example.

Example 5

Figure 15:
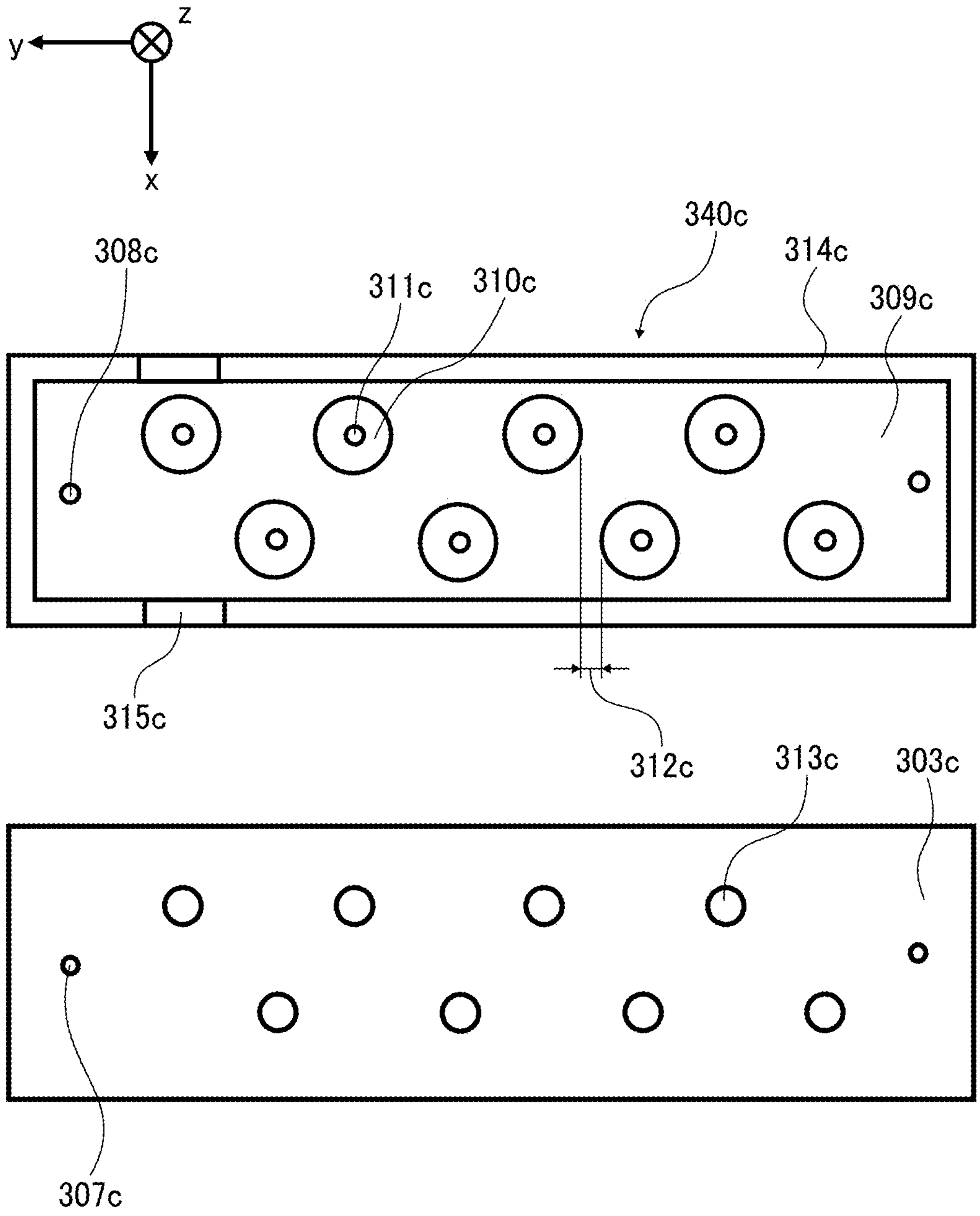
FIG. 15 is a diagram illustrating Embodiment 5 (Example 5) according to the present embodiment.

FIG. 15 is a diagram illustrating Embodiment 5 (Example 5) according to the present embodiment. The embodiment according to the present embodiment will be described below with reference to FIG. 15.

The present example is different from Example 2 in the arrangement of connecting portions provided on a housing side and nozzles of a nozzle plate. Note that other configurations are assumed to be the same as those according to Example 2. Therefore, differences from Example 2 will be mainly described below. Note that reference numerals of terms are also given again for convenience of description.

First, in the present embodiment, as illustrated in FIG. 15, eight connecting portions 310*c* are arranged on a connecting portion forming surface 309*c* in multiple rows of four each on an upper side (a − direction side of the x-axis in FIG. 15) and a lower side (a + direction side of the x-axis in FIG. 15) along the longitudinal direction (the y-axis direction in FIG. 15) of a housing 340*c* in FIG. 15, and are arranged in a staggered arrangement. Note that the adjacent connecting portions 310*c* are provided with gaps 312*c* so as not to be continuous with one another. Similarly, as for the nozzle plate 303*c*, as illustrated in FIG. 15, the eight nozzles 313*c* are arranged in multiple rows of four each on the upper side (the − direction side of the x-axis in FIG. 15) and the lower side (the + direction side of the x-axis in FIG. 15) along the longitudinal direction (the y-axis direction in FIG. 15) of a nozzle plate 303*c* in FIG. 15, and are arranged in a staggered arrangement.

As illustrated in FIG. 15, the present embodiment can be configured such that the connecting portions and the nozzles are arranged in multiple rows. Note that other configurations are similar to those described in Example 2. Therefore, in the housing 340*c*, a wall portion 314*c* for connection, a wall portion communication portion 315*c* which is a hole communicating with outside air in a part thereof, and the like are also formed.

In such a configuration, after positioning was performed through nozzle positioning holes 307*c* and housing positioning holes 308*c*, the nozzle plate 303*c* and the housing 340*c* were integrated and put into a vacuum high-temperature furnace as illustrated in FIGS. 4A and 4B to perform the diffusion bonding. Note that the conditions for the diffusion bonding at this time are the same as those in Examples 1, 2, and the like.

In the liquid discharge head thus produced, the elongation amount of the distance from the nozzle plate positioning holes 307*c* to each nozzles 313*c* could be suppressed compared with the configuration according to the comparative example.

Example 6

Figure 16:
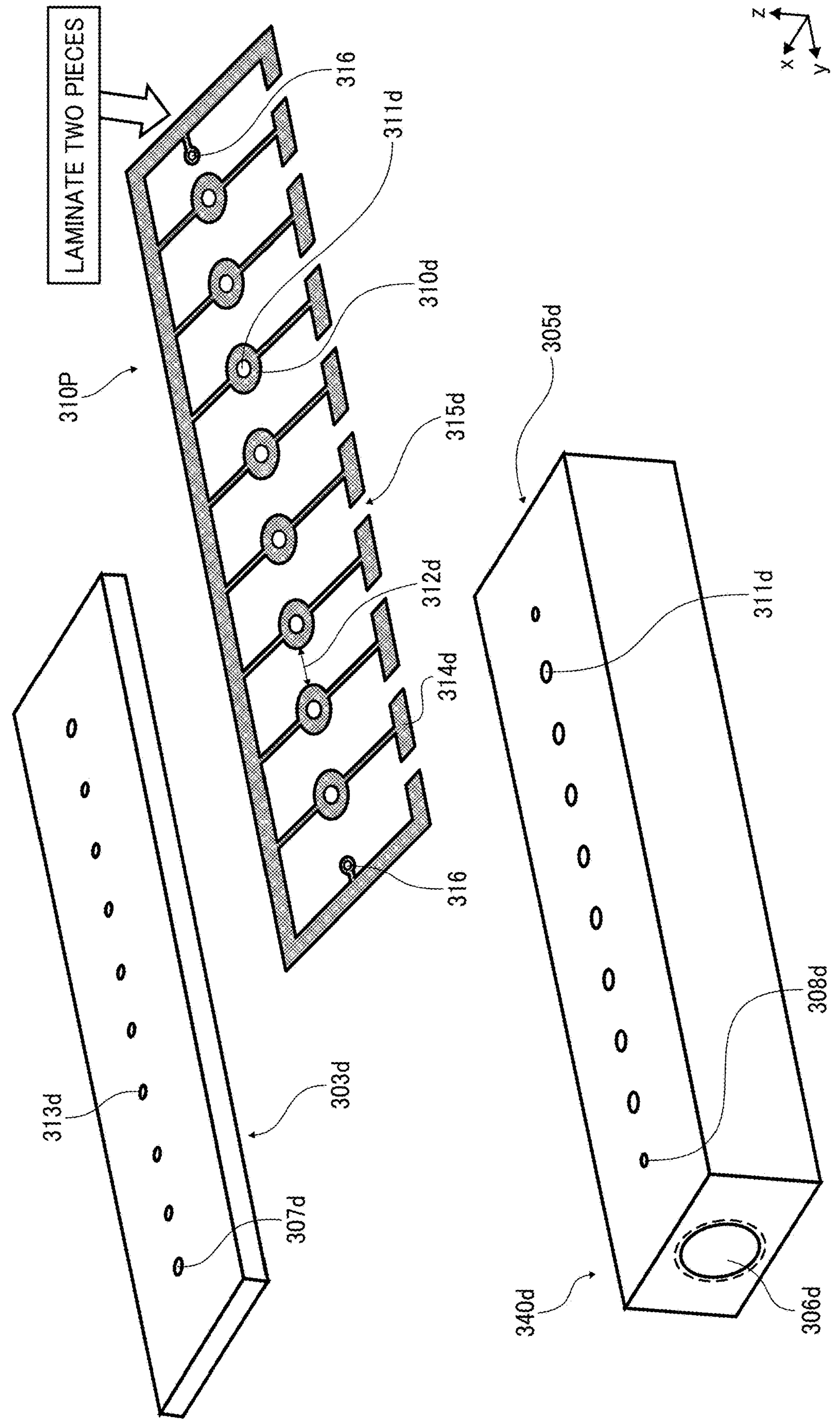
FIG. 16 is a diagram illustrating Embodiment 6 (Example 6) according to the present embodiment.

FIG. 16 is a diagram illustrating Embodiment 6 (Example 6) according to the present embodiment. The embodiment according to the present embodiment will be described below with reference to FIG. 16.

The present embodiment is different from Example 2 so far in that a connecting portion for diffusion bonding and a wall portion for bonding are formed of a member different from a housing and a nozzle plate, the member is positioned between the housing and the nozzle plate, and then the nozzle plate and the housing are bonded by the diffusion bonding. Note that other configurations are assumed to be the same as those according to Example 2. Therefore, differences from Example 2 will be mainly described below. Reference numerals of terms are also given again for convenience of description.

First, as illustrated in FIG. 16, in the present embodiment, a separate connecting portion member 310P (also referred to as a diffusion bonding member, an example of diffusion bonding member), which is a connection member for diffusion bonding and is a member different from a housing 340*d* and the nozzle plate 303*d*, is provided. The separate connecting portion member 310P includes connecting portions 310*d* for diffusion bonding, a positioning hole (a separate member positioning hole) 316, and a wall portion

314*d* for bonding. The cylindrical connecting portions 310*d* are arranged side by side in the longitudinal direction (the y-axis direction in FIG. 16) of the separate connecting portion member 310P at a predetermined distance, and the adjacent connecting portions 310*d* are provided with gaps 312*d* so as not to be continuous with one another. The wall portion 314*d* is partially provided with a wall portion communication portion 315*d*, which is a hole communicating with outside air.

The connecting portions 310*d* are connected to a part of a wall portion 314*b* in a lateral direction (the x-axis direction in FIG. 16) of the separate connecting portion member 310P. Similarly, a portion of the separate connecting portion member 310P where a positioning hole 316 is formed is connected to a part of the wall portions 314*d* in the longitudinal direction (the y-axis direction in FIG. 16) of the separate connecting portion member 310P.

The separate connecting portion member 310P has a plate shape, and has the same size of the outer shape as the nozzle plate 303*d*. The wall portion 314*d* is formed along an outer edge portion (a peripheral edge portion) of the nozzle plate 303*d*. The thickness of the plate (the size in the z-axis direction in FIG. 16) was 0.05 mm, the bonding width of the connecting portion was 2 mm, and the bonding width of the wall portion was 1 mm.

In the present embodiment, as illustrated in FIG. 16, two separate connecting portion members 310P are stacked and disposed between the housing 340*d* and the nozzle plate 303*d*, and positioning is performed by positioning portions such as the nozzle positioning holes 307*d*, the positioning holes 316 of the separate connecting portion member 310P, and the housing positioning holes 308. Then, the positioning is performed, and the housing 340*d*, the two separate connecting portion members 310P, and the nozzle plate 303*d* are diffusion-bonded. In this way, in the present embodiment, multiple separate connecting portion members 310P is laminated to form the connecting portions 310*d* forming the channel 311*d*, the wall portion 314*d*, and the wall portion communication portion 315*d*, which is a hole portion communicating with the outside. Note that, although the case where two separate connecting portion members 310P are laminated has been described here, the present embodiment can be applied to a case of one separate connecting portion member or a case of three or more separate connecting portion members. As described above, in other words, the present embodiment can also be regarded as a configuration in which a connecting portion and a wall portion are formed on the housing and the nozzle plate according to the comparative example using a separate connecting portion member which is a separate member (a separate body) for diffusion bonding, and the housing and the nozzle are bonded by diffusion bonding.

In the present embodiment, in this way, it is not necessary to provide a connecting portion for diffusion bonding or the like on the housing side or the nozzle side in advance, and it is possible to form a complicated channel in the connecting portion by adopting a configuration in which the separate connecting portion members 310P, which are connecting portion members different from the above, are laminated.

In the configuration described above, after the positioning was performed through the nozzle positioning holes 307*d*, the positioning holes 316 of the separate connecting portion member 310P, and the housing positioning holes 308*d*, the nozzle plate 303*d*, the housing 340*d*, and the multiple separate connecting portion members 310P were integrated and put into a vacuum high-temperature furnace as illustrated in FIGS. 4A and 4B to perform the diffusion bonding. Note that the conditions for the diffusion bonding at this time are the same as those in Examples 1, 2, and the like.

In the liquid discharge head thus produced, the elongation amount of the distance from the nozzle plate positioning holes 307*d* to each nozzles 313*d* could be suppressed compared with the configuration according to the comparative example. The quality equivalent to that of Example 1, Example 2, or the like could be obtained.

As described above, the present embodiment includes: the nozzle plate 303*d* including the multiple nozzle holes 313*d* that discharges a liquid; the housing 340*d* that supports the nozzle plate 303*d*; and the diffusion bonding member (the separate connecting portion member) 310P provided between the nozzle plate 303*d* and the housing 340*d* and bonded to each of the nozzle plate 303*d* and the housing 340*d* by a step including diffusion bonding, and the diffusion bonding member 310P includes: the multiple connecting portions 310*d* that is brought into contact with the nozzle plate 303*d* and the housing 340*d* to bond the nozzle plate 303*d* and the housing 340*d* and is arranged in the arrangement direction of the nozzle holes 313*d*; the channel 311*d* that is formed in the connecting portions 310*d* and communicates with the nozzle holes 313*d* of the nozzle plate 303*d*; the gap 312*d* formed between the connecting portions 310*d* adjacent to one another; and the wall portion 314*d* that is brought into contact with the nozzle plate 303*d* and the housing 340*d* to bond the nozzle plate 303*d* and the housing 340*d* and is formed along the outer edge portion of the nozzle plate 303*d*.

As a result, this makes it possible to form a complicated channel in the connecting portions.

[Configuration of Examples of Liquid Discharge Apparatus]

Next, a configuration of an example of a liquid discharge apparatus will be described with reference to the drawings. Note that the configurations according to the above-described examples can be applied to the configuration described below. In addition, the X, Y, and X directions illustrated in the drawings of the present and subsequent examples are different from the previous definitions of the directions.

Figure 17A:
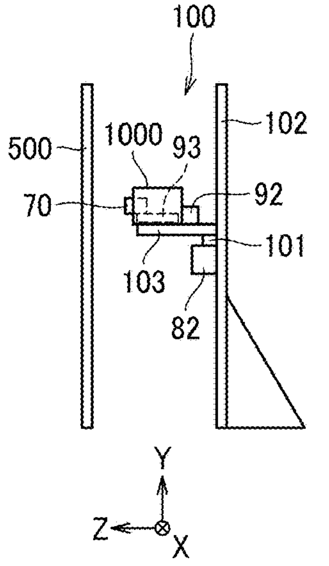
FIGS. 17A and 17B are overall schematic configuration diagrams of a liquid discharge apparatus.
Figure 17B:
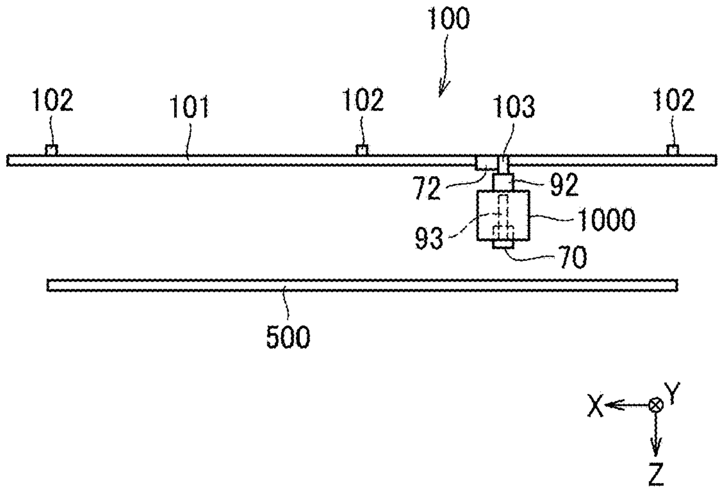

FIGS. 17A and 17B are overall schematic configuration diagrams of a liquid discharge apparatus 100 (an example of a liquid discharge apparatus). FIG. 17A is a side view of the liquid discharge apparatus, and FIG. 17B is a plan view of the liquid discharge apparatus. The liquid discharge apparatus 100 is disposed facing a liquid application target 500, which is an example of an object. The liquid discharge apparatus 100 includes an X-axis rail 101, a Y-axis rail 102 that intersects the X-axis rail 101, and a Z-axis rail 103 that intersects the X-axis rail 101 and the Y-axis rail 102. In particular, in the present embodiment, the rails 101, 102, and 103 extend in directions orthogonal to one another.

The Y-axis rail 102 holds the X-axis rail 101 so that the X-axis rail 101 is movable in the Y-axis direction. The X-axis rail 101 holds the Z-axis rail 103 so that the Z-axis rail 103 is movable in the X-axis direction. The Z-axis rail 103 holds a carriage 1000 (an example of a discharge head support unit) so that the carriage 1000 is movable in the Z-axis direction.

The liquid discharge apparatus 100 includes a first Z-direction driver 92 and an X-direction driver 72. The first Z-direction driver 92 moves the carriage 1000 in the Z-direction along the Z-axis rail 103. The X-direction driver 72 moves the Z-axis rail 103 in the X-direction along the X-axis rail 101. The liquid discharge apparatus 100 further includes a Y-direction driver 82 that moves the X-axis rail 101 in the Y-axis direction along the Y-axis rail 102. The liquid discharge apparatus 100 further includes a second Z-direction driver 93 that moves a head holder 70 in the Z-axis direction with respect to the carriage 1000.

The discharge head described above is attached to the head holder 70 such that the nozzle 13 of the discharge head 1 faces the liquid application target 500. The liquid discharge apparatus 100 configured as described above discharges an ink which is an example of liquid from the discharge head 1 attached to the head holder 70 toward the liquid application target 500 while moving the carriage 1000 in the X-axis, Y-axis, and Z-axis directions, and performs drawing on the liquid application target 500.

Next, a configuration of an inkjet printer 201 which is another example of the liquid discharge apparatus will be described below with reference to the drawings.

Figure 18:
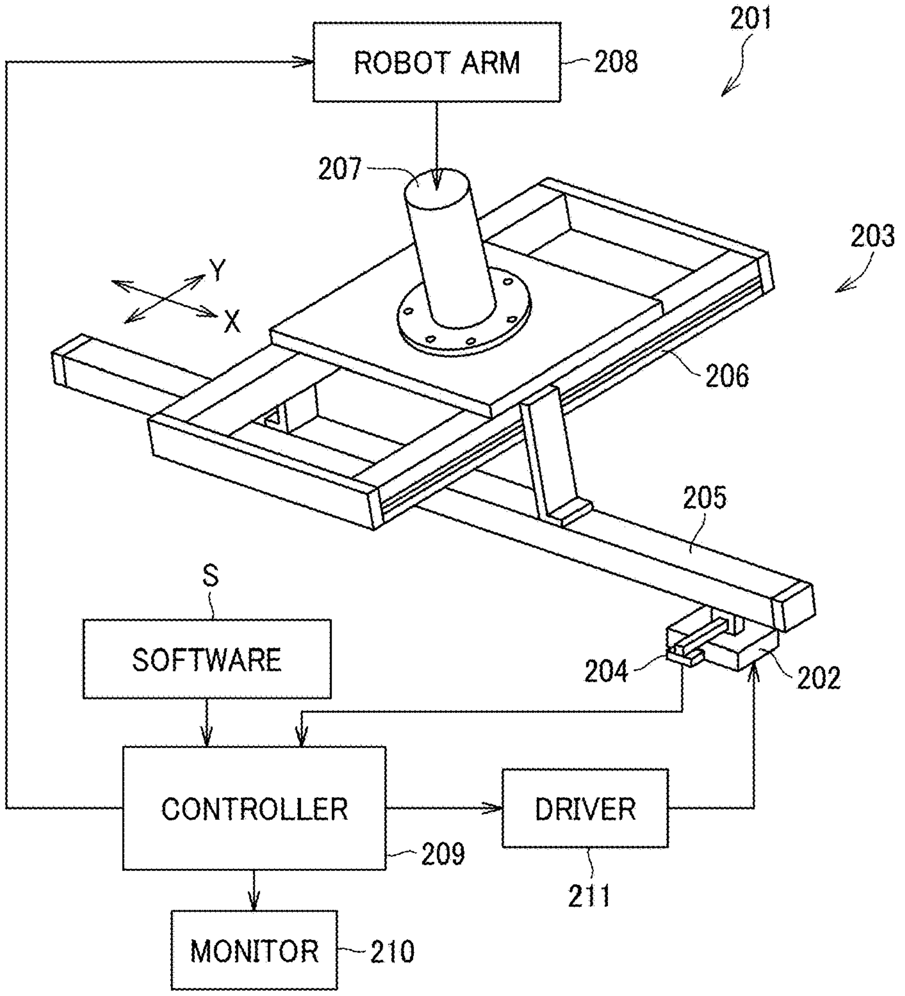
FIG. 18 is an overall schematic configuration diagram of another liquid discharge apparatus.

As illustrated in FIG. 18, the inkjet printer 201 according to the present embodiment includes a print head 202, an X-Y table 203, a camera 204, a controller 209, a driver 211, and the like.

The print head 202 is an inkjet type liquid discharge head that discharges an ink (a liquid) toward a surface to be coated of an object to be coated M. The term "ink" as used herein includes "paint". The print head 202 includes multiple valve-type nozzles, and the ink is ejected from each valve-type nozzle in a direction perpendicular to a discharge surface of the print head 202. In other words, the discharging surface of ink of the print head 202 is parallel to an XY plane formed by the movement of the X-Y table 203, and ink dots discharged from each valve-type nozzle are discharged in a direction perpendicular to the X-Y plane. The discharging direction of the ink discharged from each valve-type nozzle is parallel. Each valve-type nozzle is bonded to an ink tank of a predetermined color. Since the ink tank is pressurized by a pressurizing device, if a distance between each valve-type nozzle and a print target surface of the object to be coated M is about 20 cm, the ink dots can be discharged from each valve-type nozzle to the print target surface without any disadvantage.

Figure 19:
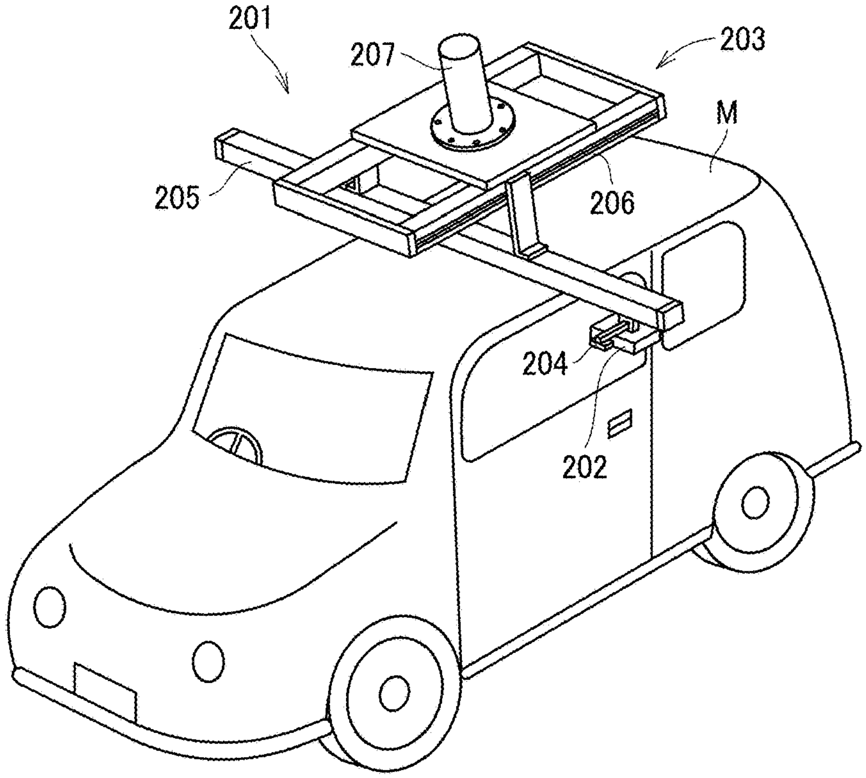
FIG. 19 is a perspective view illustrating an arrangement example of the liquid discharge apparatus with respect to an automobile.
Figure 20:
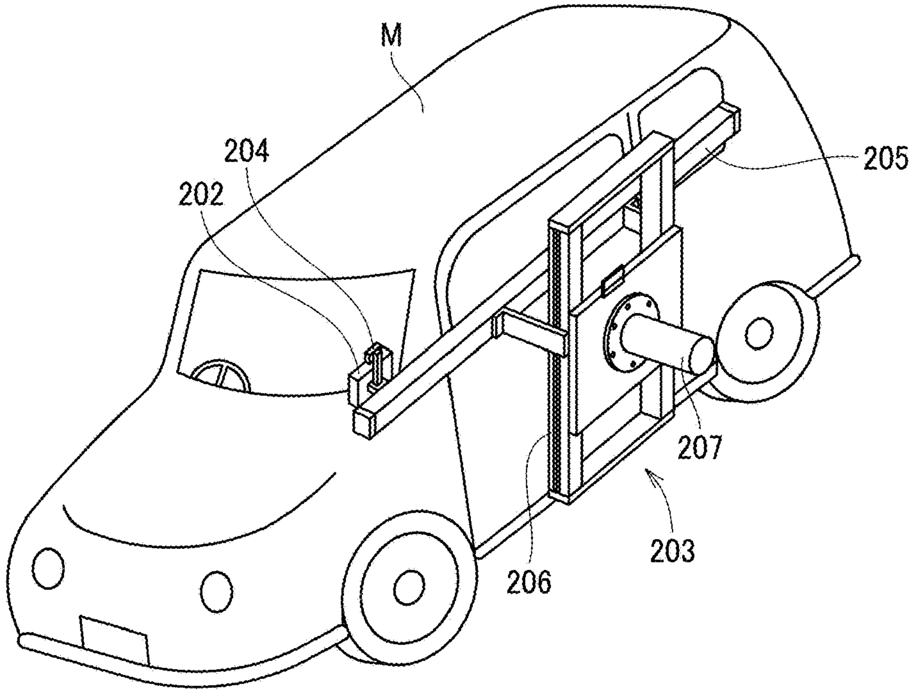
FIG. 20 is a perspective view illustrating another arrangement example of the liquid discharge apparatus with respect to the automobile.

The X-Y table 203 includes a mechanism that moves the print head 202 and the camera 204 in the X direction and the Y direction orthogonal to each other. Specifically, the X-Y table 203 includes an X-axis moving mechanism 205 that moves a slider holding the print head 202 and a camera 204 to be described later in the X direction, and a Y-axis moving mechanism 206 that moves the X-axis moving mechanism 205 in the Y direction while holding the X-axis moving mechanism by two arms. The Y-axis moving mechanism 206 is provided with a shaft 207, and a robot arm 208 holds and drives the shaft 207, so that the print head 202 can be freely arranged at a predetermined position where printing is to be performed on the object to be coated M. For example, in a case where the object to be coated M is an automobile, the robot arm 208 may set the print head 202 to an upper part of the automobile as illustrated in FIG. 19 or at a lateral position of the automobile as illustrated in FIG. 20.

The operation of the robot arm 208 is controlled based on a program stored in advance in the controller 209.

The camera 204 is an imaging unit such as a digital camera that photographs a print target surface of the object to be coated M. The camera 204 photographs a predetermined range of the print target surface of the object to be coated M at constant minute intervals while moving in the X direction and the Y direction by the X-axis moving mechanism 205 and the Y-axis moving mechanism 206. Specifications such as a lens and resolution of the camera 204 are appropriately selected so that multiple subdivided images can be captured in a predetermined range of the print target surface.

Photographing of the multiple subdivided images of the print target surface by the camera 204 is continuously and automatically performed by the controller 209 to be described later.

The controller 209 operates the X-Y table 203 based on image editing software S for editing an image photographed by the camera 204 and a preset control program to control a print operation (an ink discharge operation) of the print head 202. The controller 209 is configured by a so-called microcomputer, and includes a storage that records and stores various programs, data of a photographed image, data of an image to be printed, and the like, a central processor that executes various processes according to the programs, an inputter such as a keyboard and a mouse, and a DVD player as necessary. The controller 209 further includes a monitor 210. The monitor 210 displays input information to the controller 209, a processing result by the controller 209, and the like.

The controller 209 performs image processing on the multiple pieces of subdivided image data photographed by the camera 204 using image processing software, and generates a print target surface that is not a flat surface of the object to be coated M as a composite print surface projected on a flat surface. The controller 209 superimposes a drawing target image printed so as to be continuous with the image already printed on the print target surface on the composite print surface, and performs editing so that the drawing target image is continuous with an edge portion of the printed image to generate the edited image to be drawn. For example, for a print image 252*b* that is the image to be drawn illustrated in FIG. 21C, the print image 252*b* is edited so as to be matched with the composite print surface such that a non-print region 253 is not formed between the print image 252*b* and the adjacent print image 252*a*, thereby generating the edited image to be drawn. Then, by discharging the ink from the print head 202 onto the print target surface based on the generated edited image to be drawn, a new image is printed without generating a gap from the printed image.

The operation of photographing the multiple subdivided images by the camera 204 and printing by discharging the ink from each nozzle of the print head 202 is performed by the driver 211 whose operation is controlled by the controller 209.

Figure 21A:
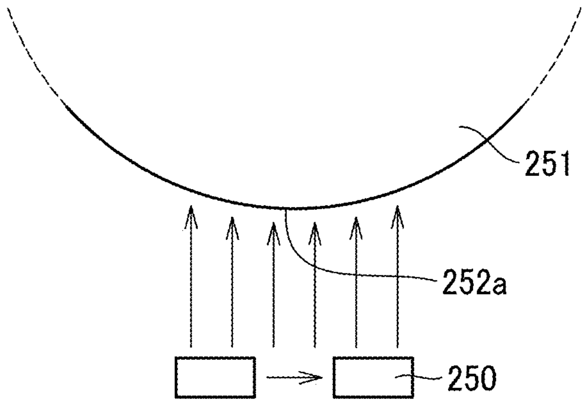
FIGS. 21A to 21C are explanatory diagrams of a case where a liquid is discharged onto a spherical surface by the liquid discharge apparatus.
Figure 21B:
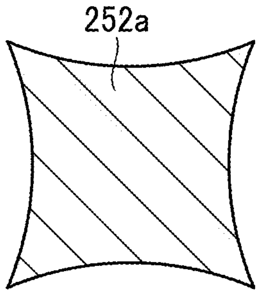
Figure 21C:
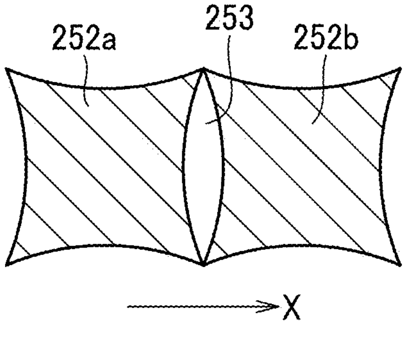

FIG. 21A illustrates the discharging direction of the ink ejected from each inkjet nozzle mounted on a nozzle head 250 in a case where a two-dimensional quadrangle is formed by the inkjet nozzle on a spherical surface of the liquid application target 251 of the spherical object. In FIG. 21B, since the ink ejected from each inkjet nozzle mounted on the nozzle head 250 is ejected in a direction perpendicular to the nozzle head 250, it is illustrated that the print image 252*a* printed on the surface of the liquid application target 251 has a quadrangular shape in which the periphery is distorted.

[Electrode Manufacturing Apparatus]

Figure 22:
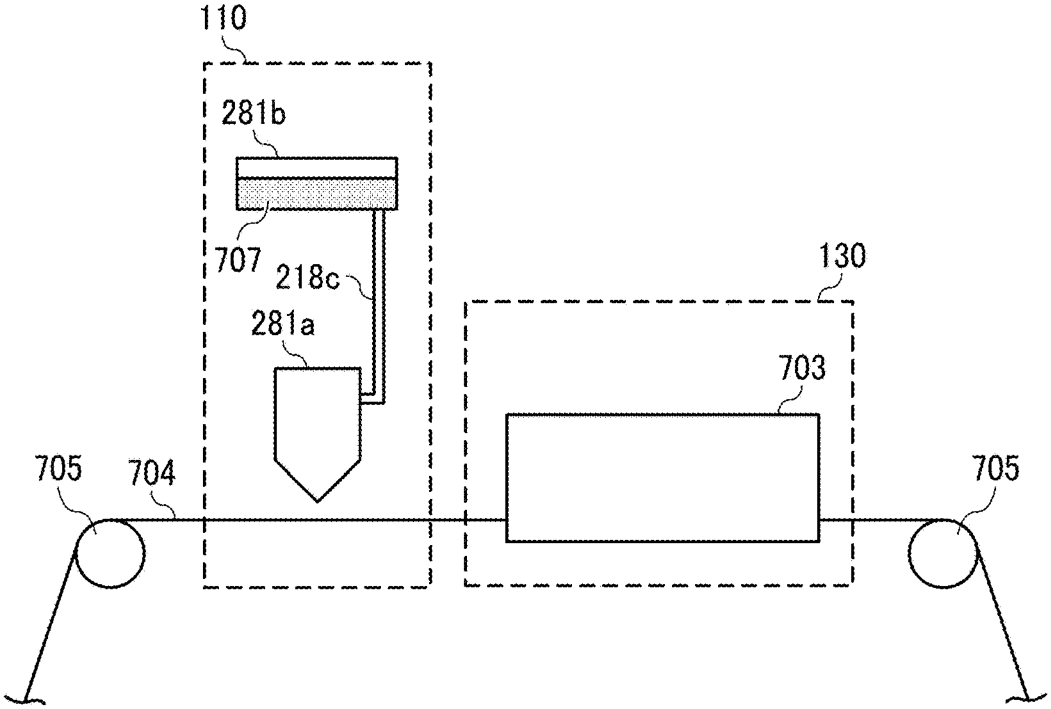
FIG. 22 is a schematic view illustrating an example of an electrode manufacturing apparatus for implementing a method for manufacturing an electrode according to the embodiment.

The embodiment according to the present embodiment includes an electrode and a manufacturing apparatus for an electrochemical element. The electrode manufacturing apparatus is described below. FIG. 22 is the schematic view of an example of an electrode manufacturing apparatus according to an example of the present embodiment. The manufacturing apparatus for an electrode is an apparatus for manufacturing an electrode having a layer having an electrode material by discharging a liquid composition using the above-described liquid discharge apparatus.

[Layer Forming Means Having Electrode Material, and Layer Forming Step Having Electrode Material]

The discharging means in the present embodiment is the above-described liquid discharge apparatus. By the discharge, the liquid composition can be applied onto the object to form a liquid composition layer. The object (hereinafter, it may be referred to as a "discharge target object") is not particularly limited as long as it is an object for forming a layer having an electrode material, and can be appropriately selected according to a purpose, and examples thereof include an electrode substrate (a current collector), an active material layer, and a layer having a solid electrode material. The discharging means and the discharging step may directly discharge the liquid composition to form the layer having the electrode material, or may indirectly discharge the liquid composition to form the layer having the electrode material as long as it is possible to form the layer having the electrode material on the discharge target.

[Other Configurations and Other Steps]

Other configurations in the manufacturing apparatus for an electrode mixture layer are not particularly limited as long as the effects of the present embodiment are not impaired, and can be appropriately selected according to a purpose, and examples thereof include a heating means. The other steps in the manufacturing method for an electrode mixture layer are not particularly limited as long as the effects of the present embodiment are not impaired, and can be appropriately selected according to a purpose, and examples thereof include a heating step.

[Heating Means and Heating Step]

The heating means heats the liquid composition discharged by a discharging unit. The heating step is a step of heating the liquid composition discharged in the discharging step.

The liquid composition layer can be dried by the heating.

[Configuration of Forming Layer Having Electrode Material by Directly Discharging Liquid Composition]

As an example of the manufacturing apparatus for electrode, an electrode manufacturing apparatus for forming an electrode mixture layer containing an active material on an electrode substrate (the current collector) is described below. The electrode manufacturing apparatus includes a discharge processor 110 and a heating processor 130. The discharge processor 110 performs a step of applying a liquid composition onto a printing base material 704 having a discharge target object to form a liquid composition layer. The heating processor 130 performs a heating step of heating the liquid composition layer to obtain an electrode mixture layer.

The electrode manufacturing apparatus includes a transport unit 705 that transports the printing base material 704, and the transport unit 705 transports the printing base material 704 at a preset speed in an order of the discharge processor 110 and the heating processor 130. A manufacturing method for the printing base material 704 having the discharge target such as an active material layer is not particularly limited, and a known method can be appropriately selected. The discharge processor 110 includes a printing device 281*a* of the present embodiment that realizes an applying step of applying the liquid composition onto the printing base material 704, a storage container 281*b* that stores the liquid composition, and a supply tube 281*c* that supplies the liquid composition stored in the storage container 281*b* to a printing device 281*a*.

The storage container 281*b* stores a liquid composition 707, and the discharge processor 110 discharges the liquid composition 707 from the printing device 281*a* to apply the liquid composition 707 onto the printing base material 704 to form a liquid composition layer in a thin film shape. The storage container 281*b* may be integrated with the manufacturing apparatus for the electrode mixture layer, or may be detachable from the manufacturing apparatus for the electrode mixture layer. The container may be a container integrated with the manufacturing apparatus for the electrode mixture layer or a container used for being added to a container detachable from the manufacturing apparatus for the electrode mixture layer.

The storage container 281*b* and the supply tube 281*c* can be arbitrarily selected as long as the liquid composition 707 can be stably stored and supplied to the liquid discharge head.

As illustrated in FIG. 22, the heating processor 130 has a heating device 703, and includes a solvent removal step of heating and drying the solvent remaining in the liquid composition layer by the heating device 703 to remove the solvent.

Thus, the electrode mixture layer can be formed. The heating processor 130 may perform the solvent removal step under reduced pressure.

The heating device 703 is not particularly limited, and can be appropriately selected according to a purpose, and examples thereof include a substrate heating device, an IR heater, and a warm air heater, and these may be combined. Heating temperature and time can be appropriately selected according to a boiling point of the solvent contained in the liquid composition 707 and a film thickness to be formed.

Figure 23:
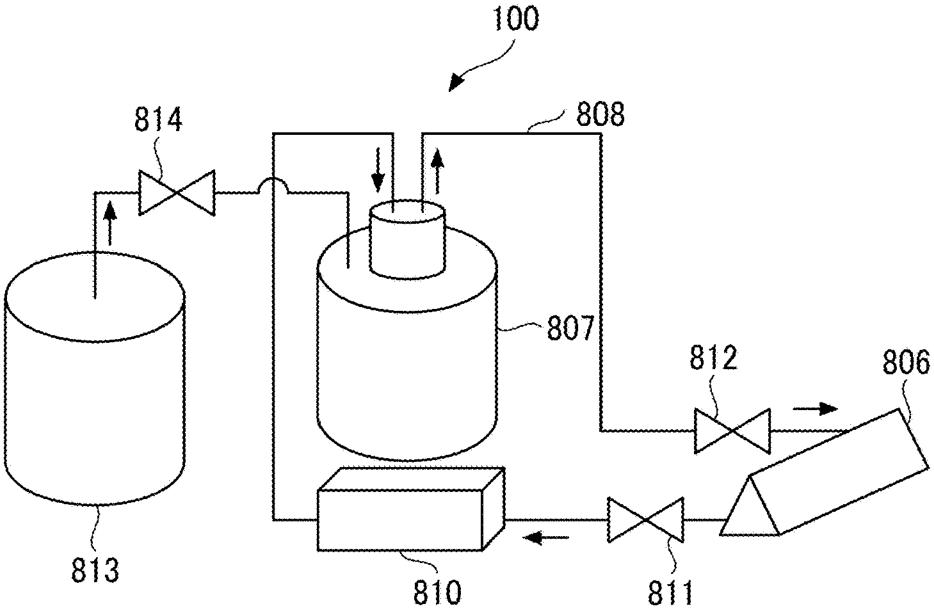
FIG. 23 is a schematic view illustrating another example of the electrode manufacturing apparatus for implementing a method for manufacturing an electrode mixture layer according to the embodiment.

FIG. 23 is the schematic diagram illustrating another example of the manufacturing apparatus for an electrode (the liquid discharge apparatus) according to the present embodiment. The liquid discharge apparatus 100 can circulate the liquid composition through the discharge head 1, a tank 807, and a tube 808 by controlling a pump 810 and control valves 811 and 812. The liquid discharge apparatus 100 is provided with an external tank 813, and when the liquid composition in the tank 807 decreases, it is also possible to supply the liquid composition from the external tank 813 to the tank 807 by controlling the pump 810 and the control valves 811, 812, and 814. When the electrode manufacturing apparatus according to the present embodiment is used, the liquid composition can be discharged to a target place of the discharge target object. The electrode mixture layer can be suitably used as, for example, a part of the configuration of an electrochemical element. The configuration other than the electrode mixture layer in the electrochemical element is not particularly limited, and a known configuration can be appropriately selected, and examples thereof include a positive electrode, a negative electrode, and a separator.

The above description is an example, and the present embodiment has unique effects for each of the following aspects.

First Aspect

According to a first aspect, a liquid discharge head (for example, the discharge head 1) includes: a nozzle plate (for example, the nozzle plates 303, 303*a*, 303*b*, and 303*c*) having multiple nozzle holes (for example, the nozzles 313, 313*a*, 313*b*, and 313*c*) that discharges a liquid (for example, an ink); a housing (for example, the housings 340, 340*a*, 340*b*, and 340*c*) that supports the nozzle plate and is bonded to the nozzle plate by a step including diffusion bonding; multiple connecting portions (for example, the connecting portions 310, 310*a*, 310*b*, and 310*c*) that is formed in either the nozzle plate or the housing, is brought into contact with the nozzle plate and the housing to bond the nozzle plate and the housing, and is arranged in an arrangement direction of the nozzle holes; a channel (the channels 311, 311*a*, 311*b*, and 311*c*) that is formed in the connecting portions and communicates with the nozzle holes of the nozzle plate; and a gap (the gaps 312, 312*a*, 312*b*, and 312*c*) formed between the connecting portions adjacent to one another.

Second Aspect

According to a second aspect, in the liquid discharge head of the first aspect, the multiple connecting portions is formed on the housing.

Third Aspect

According to a third aspect, in the liquid discharge head of the first aspect, the multiple connecting portions is formed on the nozzle plate.

Fourth Aspect

According to a fourth aspect, the liquid discharge head of any of the first aspect to the third aspect includes a wall portion (for example, the wall portions 314, 314*a*, 314*b*, and 314*c*) that is formed on either an outer edge portion of the nozzle plate or an outer edge portion of the housing and is brought into contact with the nozzle plate and the housing to bond the nozzle plate and the housing.

Fifth Aspect

According to a fifth aspect, in the liquid discharge head of the fourth aspect, when a distance from the housing to the nozzle plate in the connecting portions is defined as a height, the nozzle plate is bonded and supported by the connecting portions and the wall portion having the same height as the connecting portions, and the wall portion has a side surface provided with a hole portion communicating with the outside of the housing.

Sixth Aspect

According to a sixth aspect, in the liquid discharge head of any of the first aspect to the fifth aspect, the connecting portions include a bonding portion that is a part surrounding the channel, and the bonding portion has a width (for example, a bonding width) equal to or larger than a minimum plate thickness required for (that can withstand) at least a pressure applied to the nozzle plate.

Seventh Aspect

According to a seventh aspect, in the liquid discharge head of any of the first aspect to the sixth aspect, the nozzle plate and the housing are formed of any of an austenitic stainless alloy, a ferritic stainless alloy, and a martensitic stainless steel alloy.

Eighth Aspect

According to an eighth aspect, in the liquid discharge head of the seventh aspect, the nozzle plate and the housing are formed of the same material.

Ninth Aspect

According to a ninth aspect, in the liquid discharge head of any of the first aspect to the eighth aspect, when a distance from the housing to the nozzle plate in the connecting portions is defined as a height of the connecting portions, the multiple connecting portions has the same height.

Tenth Aspect

According to a tenth aspect, a liquid discharge head includes: a nozzle plate (for example, the nozzle plate 303*d*) having multiple nozzle holes (for example, the nozzle 313*d*) that discharges a liquid; a housing (for example, the housing 340*d*) that supports the nozzle plate; and a diffusion bonding member (for example, the separate connecting portion member 310P) that is provided between the nozzle plate and the housing and is bonded to each of the nozzle plate and the housing by a step including diffusion bonding, and the diffusion bonding member includes: multiple connecting portions (for example, the connecting portions 310*d*) that is brought into contact with the nozzle plate and the housing to bond the nozzle plate and the housing and is arranged in an arrangement direction of the nozzle holes; a channel (for example, the channel 311*d*) that is formed in the connecting portions and communicates with the nozzle holes of the nozzle plate; a gap (for example, the gap 312*d*) formed between the connecting portions adjacent to one another; and a wall portion (for example, the wall portion 314*d*) that is brought into contact with the nozzle plate and the housing to bond the nozzle plate and the housing and is formed along an outer edge portion of the nozzle plate.

Eleventh Aspect

According to an eleventh aspect, the liquid discharge head of any of the first aspect to the tenth aspect includes: a valve body (for example, the needle valve 5) that moves to be separated from and brought into contact with the nozzle plate to open and close the nozzle holes; and moving means (for example, the piezoelectric element 7) that moves the valve body.

Twelfth Aspect

According to a twelfth aspect, in the liquid discharge head of the eleventh aspect, the valve body has a distal end portion that is an elastic body.

Thirteenth Aspect

According to a thirteenth aspect, a liquid discharge apparatus (for example, the liquid discharge apparatus 100) includes the liquid discharge head of any of the first aspect to the twelfth aspect.

Fourteenth Aspect

According to a fourteenth aspect, a method for manufacturing a liquid discharge head including: a nozzle plate having multiple nozzle holes that discharges a liquid; and a housing that supports the nozzle plate includes: a step of forming multiple connecting portions on either the nozzle plate or the housing, the multiple connecting portions being brought into contact with the nozzle plate and the housing to bond the nozzle plate and the housing and being arranged in an arrangement direction of the nozzle holes; a step of forming a channel communicating with the nozzle holes of the nozzle plate in the connecting portions; a step of forming a gap between the connecting portions adjacent to one another; and a step of bonding the nozzle plate and the housing by diffusion bonding via the connecting portions.

Numerous additional modifications and variations are possible in light of the above teachings. It is therefore to be understood that, within the scope of the above teachings, the present disclosure may be practiced otherwise than as specifically described herein. With some embodiments having thus been described, it is obvious that the same may be varied in many ways. Such variations are not to be regarded as a departure from the scope of the present disclosure and appended claims, and all such modifications are intended to be included within the scope of the present disclosure and appended claims.

The invention claimed is:

1. A liquid discharge head comprising:

a nozzle plate having multiple nozzle holes from which a liquid is dischargeable, the multiple nozzle holes arrayed in a nozzle array direction;

a housing bonded to the nozzle plate by a diffusion bonding to support the nozzle plate;

a wall portion formed on one of:

an outer peripheral portion of the nozzle plate; or an outer peripheral portion of the housing;

multiple connecting portions connected to a part of the wall portion, the multiple connecting portions:

disposed on one of the nozzle plate or the housing;

contacting the nozzle plate and the housing to bond the nozzle plate and the housing;

arrayed in the nozzle array direction; and having a channel in each of the multiple connecting portions, the channel communicating with the nozzle holes; and a gap formed between one of the multiple connecting portions and another of the multiple connecting portions adjacent to the one of the multiple connecting portions, wherein the wall portion contacts the nozzle plate and the housing to bond the nozzle plate and the housing, and each of the connecting portions is contacting the wall portion.

2. The liquid discharge head according to claim 1, wherein the multiple connecting portions are formed on the housing.

3. The liquid discharge head according to claim 1, wherein the multiple connecting portions are formed on the nozzle plate.

4. The liquid discharge head according to claim 1, wherein each of the multiple connecting portions has a height that is a distance from the housing to the nozzle plate, the wall portion having a height same as the height of the multiple connecting portions, the wall portion bonded to the nozzle plate and the housing to support the nozzle plate with the housing, and the wall portion has a hole portion communicating with an outside of the housing.

5. The liquid discharge head according to claim 1, wherein the multiple connecting portions include a bonding portion surrounding the channel, and the bonding portion has a width equal to or larger than a minimum plate thickness withstand a pressure applied to the nozzle plate.

6. The liquid discharge head according to claim 1, wherein the nozzle plate and the housing are formed of any of:

an austenitic stainless alloy;

a ferritic stainless alloy; or a martensitic stainless alloy.

7. The liquid discharge head according to claim 6, wherein the nozzle plate and the housing are formed of a same material.

8. The liquid discharge head according to claim 1, wherein each of the multiple connecting portions has a same height that is a distance from the housing to the nozzle plate.

9. The liquid discharge head according to claim 1, further comprising:

a valve body movable between a separated position separated from the nozzle plate to open one of the multiple nozzle holes; and a contact position at which the valve body contacts the nozzle plate to close one of the multiple nozzle holes; and a mover to move the valve body.

10. The liquid discharge head according to claim 9, wherein the valve body has an elastic body on a leading end of the valve body.

11. A liquid discharge apparatus comprising the liquid discharge head according to claim 10.

12. The liquid discharge head according to claim 1, wherein:

the multiple connecting portions are connected to the part of the wall portion at each end of the multiple connecting portions in an X direction.

13. The liquid discharge head according to claim 12, wherein:

the X direction is orthogonal to a Y direction, the Y direction being parallel to the nozzle array direction.

14. The liquid discharge head according to claim 1, wherein:

the multiple connecting portions are rectangular connecting portions.

15. The liquid discharge head according to claim 14, wherein:

the rectangular connecting portions are connected to the part of the wall portion at an end portion thereof in a longitudinal direction.

16. A liquid discharge head comprising:

a nozzle plate having multiple nozzle holes from each of which a liquid is dischargeable;

a housing supporting the nozzle plate;

a diffusion bonding member between the nozzle plate and the housing and bonded to each of the nozzle plate and the housing by a diffusion bonding, the diffusion bonding member including:

multiple connecting portions arrayed in an array direction of the multiple nozzle holes, the multiple connecting portions contacting the nozzle plate and the housing to bond the nozzle plate and the housing;

multiple channels in the multiple connecting portions and communicating with the multiple nozzle holes of the nozzle plate, respectively;

a gap formed between one of the multiple connecting portions and another of the multiple connecting portions adjacent to the one of the multiple connecting portions; and a wall portion along an outer periphery portion of the nozzle plate, the wall portion contacting the nozzle plate and the housing to bond the nozzle plate and the housing, wherein the multiple connecting portions are connected to a part of the wall portion, and each of the connecting portions is contacting the wall portion.

17. The liquid discharge head according to claim 16, wherein:

the multiple connecting portions are connected to the part of the wall portion at each end of the multiple connecting portions in an X direction.

18. The liquid discharge head according to claim 17, wherein:

the X direction is orthogonal to a Y direction, the Y direction being parallel to the array direction.

19. The liquid discharge head according to claim 16, wherein:

the multiple connecting portions are rectangular connecting portions, and the rectangular connecting portions are connected to the part of the wall portion at an end portion thereof in a longitudinal direction.

20. A manufacturing method comprising:

forming a wall portion on an outer peripheral portion of a nozzle plate or on an outer peripheral portion of a housing;

forming multiple connecting portions on one of the nozzle plate having multiple nozzle holes or the housing, the multiple connecting portions arrayed in an array direction of the multiple nozzle holes, wherein the multiple connecting portions are connected to a part of the wall portion and each of the connecting portions is contacting the wall portion;

forming a gap between one of the multiple connecting portions and another of the multiple connecting portions adjacent to one of the multiple connecting portions;

forming multiple channels, communicating with the multiple nozzle holes of the nozzle plate, in the multiple connecting portions, respectively;

bringing the multiple connecting portions into contact with the one of the nozzle plate or the housing to bond the nozzle plate and the housing; and performing a diffusion bonding between the nozzle plate and the housing via the multiple connecting portions.

* * * * *